(12) United States Patent
Takeuchi

(10) Patent No.: US 11,063,311 B2
(45) Date of Patent: Jul. 13, 2021

(54) BATTERY WITH EXTERNAL TERMINALS

(71) Applicant: Maxell Holdings, Ltd., Kyoto (JP)

(72) Inventor: Kyohei Takeuchi, Kyoto (JP)

(73) Assignee: MAXELL HOLDINGS, LTD., Kyoto (JP)

( * ) Notice: Subject to any disclaimer, the term of this patent is extended or adjusted under 35 U.S.C. 154(b) by 73 days.

(21) Appl. No.: 16/620,077

(22) PCT Filed: Jul. 18, 2018

(86) PCT No.: PCT/JP2018/026991
§ 371 (c)(1),
(2) Date: Dec. 6, 2019

(87) PCT Pub. No.: WO2019/017410
PCT Pub. Date: Jan. 24, 2019

(65) Prior Publication Data
US 2020/0152923 A1 May 14, 2020

(30) Foreign Application Priority Data

Jul. 18, 2017 (JP) .............................. JP2017-139498

(51) Int. Cl.
*H01M 4/02* (2006.01)
*H01M 50/10* (2021.01)
(Continued)

(52) U.S. Cl.
CPC ............. *H01M 50/10* (2021.01); *B23K 26/21* (2015.10); *H01M 50/172* (2021.01); *H01M 50/543* (2021.01)

(58) Field of Classification Search
CPC ....................................................... H01M 4/02
See application file for complete search history.

(56) References Cited

FOREIGN PATENT DOCUMENTS

JP    S6168468 U    5/1986
JP    H07262982 A   10/1995
(Continued)

OTHER PUBLICATIONS

Notification of Transmittal of Translation of the International Preliminary Report on Patentability (Form PCT/IB/338) issued in corresponding International Application No. PCT/JP2018/026991, dated Jan. 21, 2020 (7 pages).

(Continued)

*Primary Examiner* — Jacob B Marks
(74) *Attorney, Agent, or Firm* — Buchanan Ingersoll & Rooney PC

(57) ABSTRACT

A positive electrode can-side bottom face portion and a negative electrode can-side bottom face portion of a flat battery have a positive electrode can-side mounting face and a negative electrode can-side mounting face to which external terminals are attached by welding. Each external terminal includes: an outer circumferential portion that is formed so as to overlap with a region that is on an outer side relative to a position located one-half of the distance from the center, and so as not to overlap with a region which is on an inner side relative to the position located one-half of the distance from the center; a protruding portion formed so as to protrude toward the inner side of the flat battery from the outer circumferential portion; and a connection portion that electrically connects the flat battery to a device.

11 Claims, 11 Drawing Sheets

(51) Int. Cl.
*B23K 26/21* (2014.01)
*H01M 50/172* (2021.01)
*H01M 50/543* (2021.01)

(56) References Cited

FOREIGN PATENT DOCUMENTS

| | | | |
|---|---|---|---|
| JP | H10125357 A | | 5/1998 |
| JP | 2002-184385 | * | 12/2000 |
| JP | 2002184385 A | | 6/2002 |
| JP | 2002324584 A | | 11/2002 |
| JP | 2014-011049 A | | 1/2014 |
| WO | 2012086526 A1 | | 6/2012 |
| WO | 2014010396 A1 | | 1/2014 |

OTHER PUBLICATIONS

Notification Concerning Transmittal of International Preliminary Report (Form PCT/IB/326) on Patentability issued in corresponding International Application No. PCT/JP2018/026991, dated Jan. 21, 2020 (5 pages).
Supplemental European Search Report issued in corresponding European Patent Application No. 18 83 5732, dated Jun. 19, 2020 (8 pages).
International Search Report (PCT/ISA/210) dated Oct. 23, 2018, by the Japanese Patent Office as the International Searching Authority for International Application No. PCT/JP2018/026991.
Written Opinion (PCT/ISA/237) dated Oct. 23, 2018, by the Japanese Patent Office as the International Searching Authority for International Application No. PCT/JP2018/026991.

* cited by examiner

BATTERY WITH EXTERNAL TERMINALS

TECHNICAL FIELD

The present invention relates to a battery with external terminals in which the external terminals are attached to the battery by welding.

BACKGROUND ART

A battery with external terminals in which the external terminals are attached to the battery by welding is known. In the battery with external terminals, electric power is supplied from the battery to a device by electrically connecting the external terminals to the device. As such kind of battery with external terminals, for example, Patent Literature 1 discloses a flat nonaqueous electrolyte secondary battery with a lead terminal in which the lead terminal is welded to a battery case of the flat nonaqueous electrolyte secondary battery.

In the aforementioned Patent Literature 1, it is disclosed that the lead terminal is a band-like or annular metal plate. In the battery with a lead terminal disclosed in Patent Literature 1, the position at which the lead terminal is welded to the battery is at a peripheral part of the battery case that avoids a portion in which electrodes are enclosed. That is, the lead terminal is welded to the outer circumferential side of the battery case.

Thereby, the occurrence of a situation in which electrodes and separators inside the battery are damaged by heat that is generated when welding the lead terminal to the battery case is inhibited, and degradation of the battery capacity and the occurrence of a short circuit inside the battery can be prevented.

In this connection, in a configuration as disclosed in the aforementioned Patent Literature 1 in which a battery case includes a positive electrode case and a negative electrode case and in which electrodes (power-generating elements) are housed inside the battery case, particularly in the case of a battery that is provided with a high capacity, after formation of the battery, the battery case is liable to swell due to volume expansion of the power-generating elements as well as the influence of gas that is generated inside the battery and the like.

When it is attempted to connect, for example, a band-like external terminal as disclosed in Patent Literature 1 to a battery by performing welding in a state in which the battery case has swelled in this way, it is necessary to press the external terminal against the battery case so that a gap does not arise between the external terminal and the battery case. Note that, if the gap between the external terminal and the battery case is large, it may not be possible to secure the welding strength between the external terminal and the battery case because the heat during welding is not sufficiently transmitted to both the external terminal and the battery case.

In such a case, deformation of the battery case after formation of the battery is largest at the center portion of the battery case in plan view. Therefore, when attaching the band-like external terminal disclosed in the aforementioned Patent Literature 1 to the battery case, a gap between the band-like external terminal and the battery case is largest on the outer circumferential side of the battery case. Hence, in the case of welding the band-like external terminal to the battery case at the outer circumferential side of the battery case, it is necessary to perform welding while pressing down the band-like external terminal on the outer circumferential side.

CITATION LIST

Patent Literature

Patent Literature 1: Japanese Patent Laid-Open No. 2002-324584

SUMMARY OF INVENTION

Technical Problem

In order to deal with the problem, by using an annular external terminal as disclosed in Patent Literature 1 for example, the annular external terminal can be arranged at an outer circumferential portion of the battery case at which deformation is less than at the center portion.

However, even when an annular external terminal is used as described above, if deformation occurs over the entire portion at which the external terminal is attached on the battery case, there is a possibility that a gap will arise between the annular external terminal and the battery case. In such a case, since there is a possibility that the welding strength between the annular external terminal and the battery case will decrease, when welding the annular external terminal to the battery case, it is necessary to press the annular external terminal against the battery case in the vicinity of the welding position.

As described above, when attaching an external terminal to a battery by welding, the welding workability is not good because it is necessary to press down the external terminal in the vicinity of the welding position.

An object of the present invention is to obtain a configuration that, with respect to a battery with external terminals in which the external terminals are attached to the battery by welding, is capable of improving the welding workability when performing welding of the external terminals.

Solution to Problem

A battery with external terminals according to one embodiment of the present invention is a battery with external terminals in which external terminals are attached to a battery by welding. The battery includes: an exterior can including a positive electrode can-side bottom face portion and a peripheral wall portion that extends in an axial direction, and having an opening on an opposite side to the positive electrode can-side bottom face portion in the axial direction; a sealing can including a negative electrode can-side bottom face portion; and a power-generating element that is arranged in a housing space which is formed on an inner side of the exterior can and the sealing can in a state in which the peripheral wall portion of the exterior can and the sealing can are connected in a manner so that the sealing can covers the opening of the exterior can. At least one of the positive electrode can-side bottom face portion and the negative electrode can-side bottom face portion of the battery has a mounting face to which the external terminal is attached by welding. The external terminal includes: an outer circumferential portion that, with respect to the mounting face, is formed so as to overlap with a region that, with respect to a distance from a center to an outer edge of a portion constituting the mounting face when viewed in a normal line direction of the mounting face, is on an outer side relative to a position located one-half of the distance from the center, and so as not to overlap with a region which is on an inner side relative to the position located one-half of the distance from the center; at least one protruding portion that, when viewed in a normal line direction of the mounting face, is formed so as to protrude toward an inner side of the battery from the outer circumferential portion; and at least one connection portion that, when viewed in a normal line direction of the mounting face, is formed so as to protrude toward an outer side of the battery from the outer circumferential portion, and that electrically connects the battery to a device. The protruding portion has a welded part at which the protruding portion is welded to the mounting face of the battery (first configuration).

Thus, the outer circumferential portion of the external terminal is arranged on the outer circumferential side of at least one of the positive electrode can-side bottom face portion and the negative electrode can-side bottom face portion, and not on the center side of the positive electrode can-side bottom face portion of the exterior can and the negative electrode can-side bottom face portion of the sealing can, which is the side on which the amount of deformation of the exterior can and the sealing can is greatest after formation of battery. That is, at least at one of the positive electrode can-side bottom face portion of the exterior can and the negative electrode can-side bottom face portion of the sealing can, the outer circumferential portion of the external terminal is arranged on the outer circumferential side which is a side that is not liable to be affected by deformation of the battery.

Furthermore, in the aforementioned configuration, at a welded part at which the external terminal is welded to the battery, a protruding portion is provided that is formed so as to protrude from the outer circumferential portion toward the inner side of the battery. The protruding portion deforms in accordance with deformation of the mounting face to which the external terminal is attached by welding among the positive electrode can-side bottom face portion of the exterior can and the negative electrode can-side bottom face portion of the sealing can. That is, the protruding portion deforms so as to follow deformation of the battery.

Therefore, it is difficult for a gap to arise between the battery and the protruding portion that is formed in the external terminal so as to protrude toward the inner side of the battery from an outer circumferential portion that is arranged at a position at which it is difficult to be affected by deformation of the battery. Thus, the protruding portion and the battery can be easily welded together. Accordingly, the welding workability with respect to welding of the external terminal to the battery can be enhanced.

In the first configuration, the external terminal has a plurality of the protruding portions (second configuration). That is, when viewed in the normal line direction of the mounting face, the plurality of protruding portions are formed so as to protrude toward the inner side of the battery at a plurality of places on the outer circumferential portion.

Thus, a plurality of protruding portions deform in accordance with deformation of a mounting face of the battery. Hence, the plurality of protruding portions can be easily welded to the mounting face. Therefore, the welding workability when welding the external terminal to the battery can be enhanced.

In the second configuration, the plurality of protruding portions are formed so as to extend toward the center of the battery from the outer circumferential portion, when viewed in a normal line direction of the mounting face (third configuration).

As mentioned in above, in the battery, the center portion of the mounting face among the positive electrode can-side bottom face portion of the exterior can and the negative electrode can-side bottom face portion of the sealing can deforms the most. By forming a plurality of protruding portions so as to extend toward the center of the battery as mentioned above, the plurality of protruding portions can be more reliably caused to deform so as follow the deformation of the battery.

Therefore, the plurality of protruding portions can be more easily welded to the mounting face. Hence, the welding workability when welding the external terminal to the battery can be enhanced.

In the second or third configuration, with respect to the mounting face, the plurality of protruding portions do not overlap with a region that, with respect to a distance from the center to the outer edge of the portion constituting the mounting face when viewed in the normal line direction of the mounting face, is on an inner side relative to a position located at a distance from the center that is one-third of the distance (fourth configuration).

Thus, since the center portion of the mounting face is not covered by a protruding portion, readable engraving or the like can be performed at the center portion of the mounting face.

In the second or third configuration, at least one pair of protruding portions among the plurality of protruding portions are formed at positions that face each other across the center of the mounting face when viewed in the normal line direction of the mounting face (fifth configuration).

Thereby, welded parts of one pair of protruding portions are positioned so as to face each other across the center of the mounting face when viewed in the normal line direction of the mounting face of the battery. Hence, the external terminal and the battery can be fixed in a more stable state by welding.

In the fifth configuration, the one pair of protruding portions are formed so as to connect to each other at the center of the mounting face when viewed in the normal line direction of the mounting face (sixth configuration).

Thereby, protruding portions that are connected to each other at the center of the mounting face deform so as to follow the mounting face that deformed in a manner in which the center of the battery (center of the mounting face) is the vertex. Hence, welding of the external terminal and the battery can be performed with ease. Accordingly, the welding workability when welding the external terminal to the battery can be improved.

In the first configuration, when viewed in the normal line direction of the mounting face, the outer circumferential portion of the external terminal is formed so as to follow at least one part of an outer shape of the portion constituting the mounting face (seventh configuration).

Thereby, positioning of the external terminal is facilitated, and the welding workability when welding the external terminal to the battery can be improved.

In the seventh configuration, the outer circumferential portion of the external terminal is formed in a circular arc shape or an annular shape, when viewed in the normal line direction of the mounting face (eighth configuration).

Thereby, the outer circumferential portion of the external terminal is easily caused to follow the outer shape of the portion constituting the mounting face of the battery. Hence, positioning of the external terminal with respect to the mounting face of the battery becomes easier.

In any one configuration among the first to eighth configurations, the battery is a flat shape in which a dimension in a direction perpendicular to the axial direction is larger than a dimension in the axial direction (ninth configuration).

In this kind of flat-shaped battery, the positive electrode can-side bottom face portion of the exterior can and the negative electrode can-side bottom face portion of the sealing can are liable to swell due to expansion of a power-generating element or the like that is caused by formation of the battery or the like. With respect to such a configuration, the welding workability when welding an external terminal to the battery can be improved by applying any one of the aforementioned first to eighth configurations.

In any one configuration among the first to ninth configurations, the battery is a secondary battery (tenth configuration).

In a case where a battery is a secondary battery, in general, in comparison to a primary battery, a voltage that is applied after battery assembly is high, and in addition the volume expansion of an electrode body is large and the generated amount of gas is also large. Therefore, in the case of a secondary battery, the amount of deformation after battery formation is large compared to a primary battery. That is, in the case of a secondary battery, the amount of deformation of a mounting face to which an external terminal is attached is large compared to a primary battery. Furthermore, after an external terminal is attached to a secondary battery by welding, because the secondary battery repeatedly expands and contracts due to charging and discharging of the secondary battery, a relatively large force is liable to be applied to a welding portion at which the external terminal and the secondary battery are welded together.

In order to deal with the problem, by applying any one of the aforementioned first to ninth configurations, since the protruding portions of the external terminal deform so as to follow deformation of the mounting face of the battery, welding of the external terminal to the battery can be performed with ease.

Furthermore, by positioning the outer circumferential portion of the external terminal on the outer circumferential side which is a region of the entire mounting face at which deformation does not occur to a large degree, the influence of the battery on the external terminal can be lessened. Hence, application of a large force to a welding portion between the external terminal and the battery that is caused by charging and discharging of the battery can be prevented.

In any one configuration among the first to tenth configurations, the welded part is formed by laser welding (eleventh configuration).

When welding an external terminal to a battery as described above by laser welding, if a gap arises between the external terminal and the battery, there is a possibility that sufficient welding strength cannot be secured. Therefore, it is necessary to press the external terminal against the battery.

In order to deal with the problem, by applying any one of the aforementioned first to tenth configurations, the external terminal and the battery can be easily welded together by laser welding.

Advantageous Effects of Invention

In a battery with external terminals according to one embodiment of the present invention, an external terminal that is attached by welding to a mounting face of the battery includes: an outer circumferential portion that, with respect to the mounting face, is formed so as to overlap with a region that, with respect to a distance from the center to the outer edge of a portion constituting the mounting face when viewed in a normal line direction of the mounting face, is on the outer side relative to a position located one-half of the distance from the center, and so as not to overlap with a region which is on an inner side relative to a position located one-half of the distance from the center; and at least one protruding portion that, when viewed in the normal line direction of the mounting face, is formed so as to protrude toward the inner side of the battery from the outer circumferential portion. The protruding portion has a welded part that is welded to the mounting face of the battery. Thereby, the welding workability when welding the external terminal to the battery can be improved.

DESCRIPTION OF EMBODIMENTS

Figure 1:
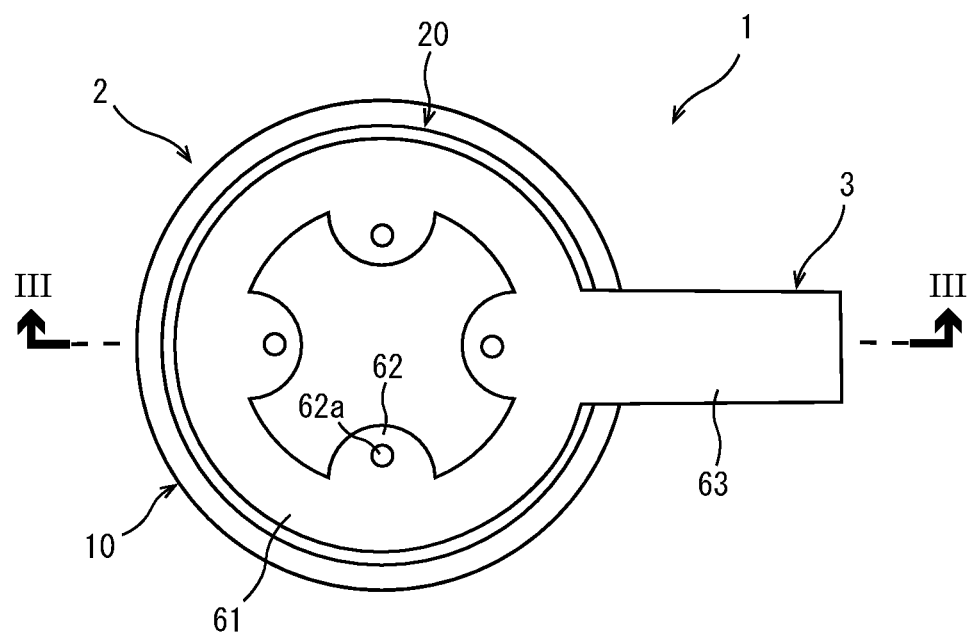
FIG. 1 is a plan view illustrating a schematic configuration of a battery with external terminals according to Embodiment 1 of the present invention.

Hereunder, embodiments of the present invention are described in detail with reference to the accompanying drawings. The same or equivalent parts in the drawings are denoted by the same reference numerals and a description of such parts is not repeated.

Embodiment 1

(Overall Configuration)

Figure 2:
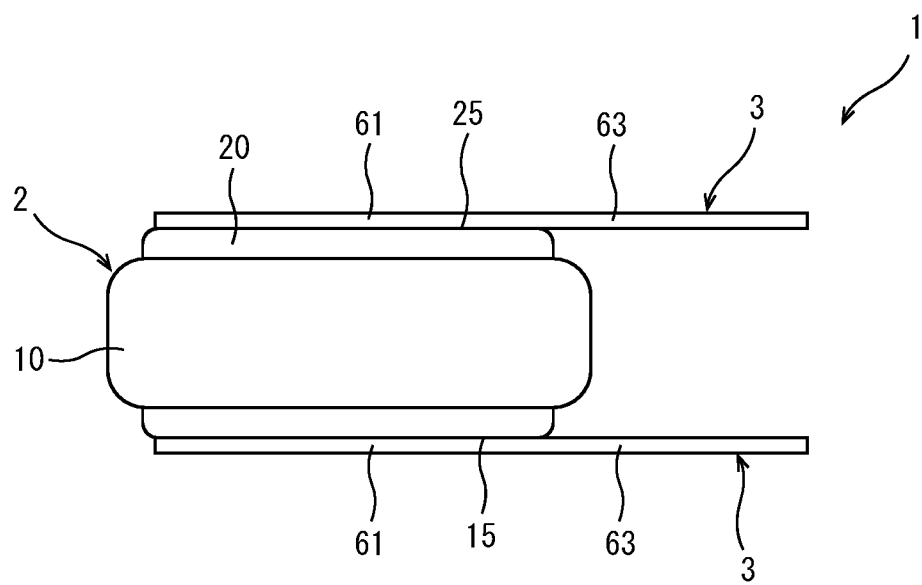
FIG. 2 is a side view illustrating a schematic configuration of the battery with external terminals.
Figure 3:
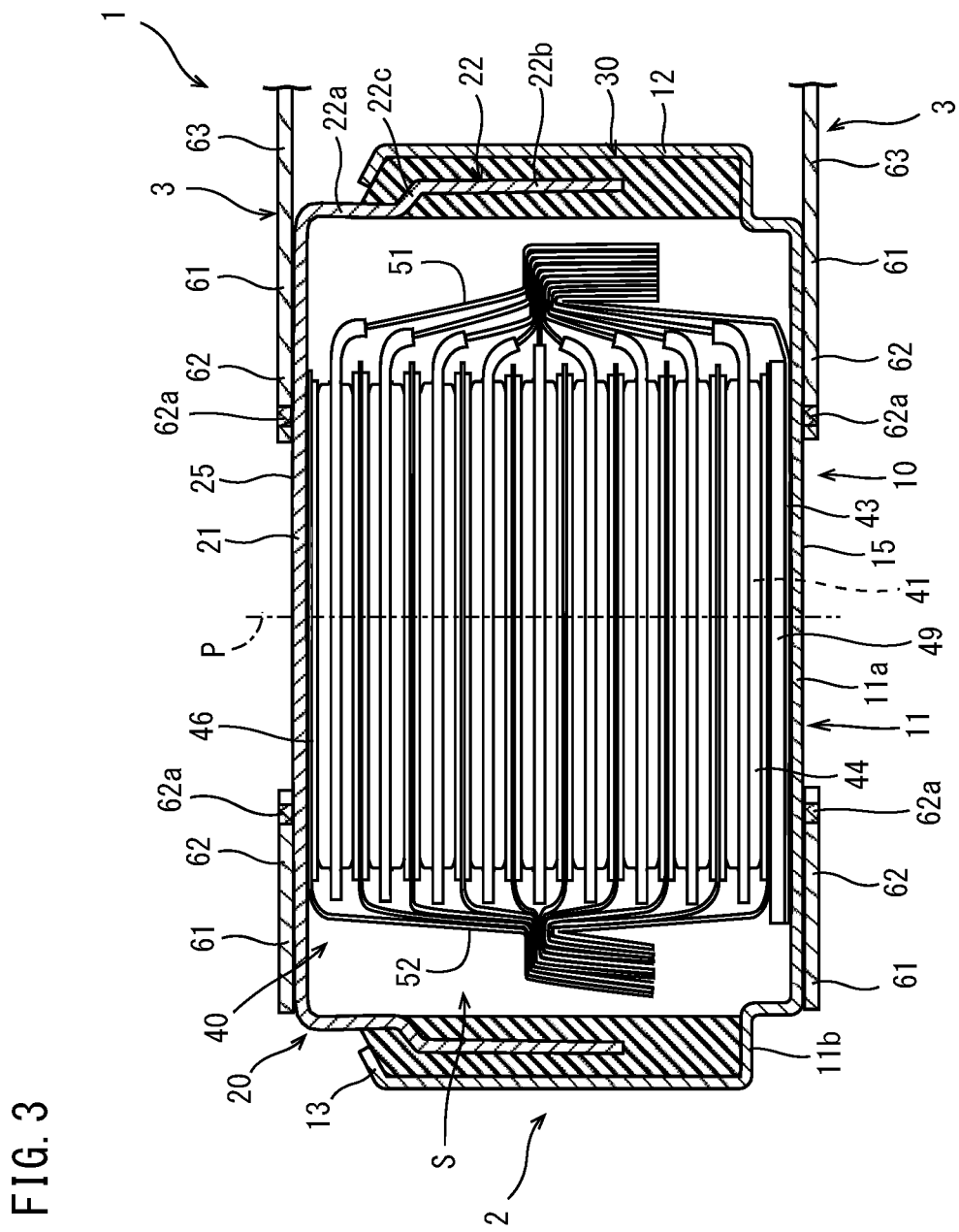
FIG. 3 is a cross-sectional view along a line III-III in FIG. 1.

FIG. 1 is a plan view illustrating a schematic configuration of a battery with external terminals 1 according to Embodiment 1 of the present invention. FIG. 2 is a side view illustrating a schematic configuration of the battery with external terminals 1. FIG. 3 is a cross-sectional view along a line III-III in FIG. 1. Note that, in FIG. 3, components other than an electrode body 40 in the battery with external terminals 1 are illustrated in cross section.

The battery with external terminals 1 is constituted by attaching external terminals 3 to a flat battery 2 (battery) by welding, and is configured to be capable of supplying electric power to an unshown device from the flat battery 2 through the external terminals 3. That is, the battery with external terminals 1 includes the flat battery 2 and the external terminals 3.

Note that, as described later, the battery with external terminals 1 is obtained by attaching the external terminals 3 by welding to the flat battery 2 after formation. Therefore, when attaching the external terminals 3 to the flat battery 2, the flat battery 2 has already deformed due to the battery formation. However, in FIG. 1 to FIG. 3, for the purpose of description, a state in which the flat battery 2 is not deformed is illustrated.

The flat battery 2 includes: a positive electrode can 10 as a bottomed cylindrical exterior can; a negative electrode can 20 as a sealing can that covers an opening of the positive electrode can 10; a gasket 30 that is inserted between the positive electrode can 10 and the negative electrode can 20; and an electrode body 40 (power-generating element) that is housed in a housing space S formed between the positive electrode can 10 and the negative electrode can 20.

The positive electrode can 10 and the negative electrode can 20 are assembled to thereby constitute the flat battery 2. The shape of the flat battery 2 is a flat cylindrical shape in which a dimension in the radial direction is greater than a dimension in the thickness direction. A non-aqueous electrolyte (not shown) is enclosed in the housing space S formed between the positive electrode can 10 and the negative electrode can 20 of the flat battery 2, in addition to the electrode body 40.

Reference character P in FIG. 3 denotes an axis line of the cylindrical flat battery 2. In the present embodiment, with respect to the flat battery 2, the axial direction is referred to as the thickness direction, and a direction that is orthogonal to the axial direction is referred to as the radial direction.

The positive electrode can 10 is made of a metal material such as stainless steel (for example, SUS 316) and is formed to have a bottomed cylindrical shape by press-forming. The positive electrode can 10 includes a positive electrode can-side bottom face portion 11 that has a circular shape, and a cylindrical peripheral wall portion 12 formed continuously with the positive electrode can-side bottom face portion 11 at its outer circumference. As illustrated in FIG. 3, the peripheral wall portion 12 is provided so as to extend in the thickness direction of the positive electrode can-side bottom face portion 11 from an outer circumferential end of the positive electrode can-side bottom face portion 11. That is, the peripheral wall portion 12 extends in the axial direction from the positive electrode can-side bottom face portion 11. Further, the positive electrode can 10 has an opening on the opposite side to the positive electrode can-side bottom face portion 11 in the axial direction.

In a state in which the gasket 30 is inserted between the positive electrode can 10 and the negative electrode can 20 as described later, the positive electrode can 10 is crimped to the negative electrode can 20 as a result of a deformation occurring such that an opening end portion 13 (end portion on the opening side of the peripheral wall portion 12) of the peripheral wall portion 12 collapses toward the inner side in the radial direction of the positive electrode can 10.

The positive electrode can-side bottom face portion 11 has a mounting portion 11a having a circular shape in plan view that includes a positive electrode can-side mounting face 15 (mounting face), and a step portion 11b that is positioned on the outer circumferential side. As described later, the external terminal 3 is attached by welding to the positive electrode can-side mounting face 15. In the present embodiment, the outer diameter of the positive electrode can-side mounting face 15 is equal to the outer diameter of the mounting portion 11a. Note that, the normal line direction of the positive electrode can-side mounting face 15 matches the axial direction of the flat battery 2.

The negative electrode can 20 is also made of a metal material such as stainless steel (for example, NAS 64) and is formed to have a bottomed cylindrical shape by press-forming. The negative electrode can 20 has a side-wall portion 22 which has a roughly cylindrical shape and whose outer shape is smaller than the peripheral wall portion 12 of the positive electrode can 10, and a negative electrode can-side bottom face portion 21 which has a circular shape and which blocks one of the openings thereof.

Similarly to the positive electrode can 10, the side-wall portion 22 is also provided so as to extend in the thickness direction of the negative electrode can-side bottom face portion 21 from an outer circumferential end of the negative electrode can-side bottom face portion 21 in longitudinal sectional view. That is, the side-wall portion 22 extends in the axial direction from the negative electrode can-side bottom face portion 21. Further, the negative electrode can 20 has an opening on the opposite side to the negative electrode can-side bottom face portion 21 in the axial direction.

Note that, the side-wall portion 22 extends in the axial direction without a tip portion being folded back. That is, the negative electrode can 20 is a so-called "straight can" in which there is no folded-back part at the tip portion of the side-wall portion 22. Although in the present embodiment the negative electrode can 20 is a straight can, the tip portion of the side-wall portion 22 of the negative electrode can 20 may be folded back.

Further, in the side-wall portion 22, an enlarged diameter portion 22b is formed at which the diameter increases in a step shape in comparison to a base end portion 22a on the negative electrode can-side bottom face portion 21 side. That is, in the side-wall portion 22, a step-like shoulder portion 22c that extends in the radial direction is formed between the base end portion 22a and the enlarged diameter portion 22b. In the configuration of the present embodiment, the peripheral wall portion 12 of the positive electrode can 10 is pressed against the side-wall portion 22 in a state in which the gasket 30, described later, is sandwiched therebetween.

The negative electrode can-side bottom face portion 21 has a negative electrode can-side mounting face 25 (mounting face) to which the external terminal 3 is attached by welding. In the present embodiment, the outer diameter of the negative electrode can-side bottom face portion 21 of the negative electrode can 20 is equal to the outer diameter of the negative electrode can-side mounting face 25. Further, in the present embodiment, the outer diameter of the negative electrode can-side bottom face portion 21 is equal to the outer diameter of the mounting portion 11a of the positive electrode can-side bottom face portion 11 of the positive electrode can 10. Note that, the normal line direction of the negative electrode can-side mounting face 25 matches the axial direction of the flat battery 2.

In the peripheral wall portion 12 of the positive electrode can 10, the opening end portion 13 is deformed to a larger amount in the radial direction with respect to the side-wall portion 22 of the negative electrode can 20 in comparison to other portions of the peripheral wall portion 12. Further, a part of a pressing force produced by the peripheral wall portion 12 of the positive electrode can 10 is also applied to the shoulder portion 22c of the negative electrode can 20. Therefore, the gasket 30 that is described later is sandwiched between the end portion on the opening side of the side-wall portion 22 of the negative electrode can 20 and the positive electrode can-side bottom face portion 11 of the positive electrode can 10.

The gasket 30 can be made of, for example, a polyolefin resin such as polypropylene (PP), or a resin such as polyamide, polyphenylene ether (PEE), polysulfone (PSF), polyarylate (PAR), poly(ethersulfone) (PES), polyphenylene sulfide (PPS), polyether ether ketone (PEEK), or a tetrafluoroethylene-perfluoroalkoxyethylene copolymer (PFA), and in order to prevent a decrease in sealing properties at a high temperature, the gasket 30 is preferably made of a heat-resistant resin having a melting point or a thermal decomposition temperature of 200° C. or higher.

The gasket 30 is provided so as to cover a part of the side-wall portion 22 of the negative electrode can 20. That is, the gasket 30 is formed in a cylindrical shape that extends in the axial direction. When the positive electrode can 10 and the negative electrode can 20 are in an assembled state, the gasket 30 is positioned between the positive electrode can 10 and the negative electrode can 20.

Figure 4:
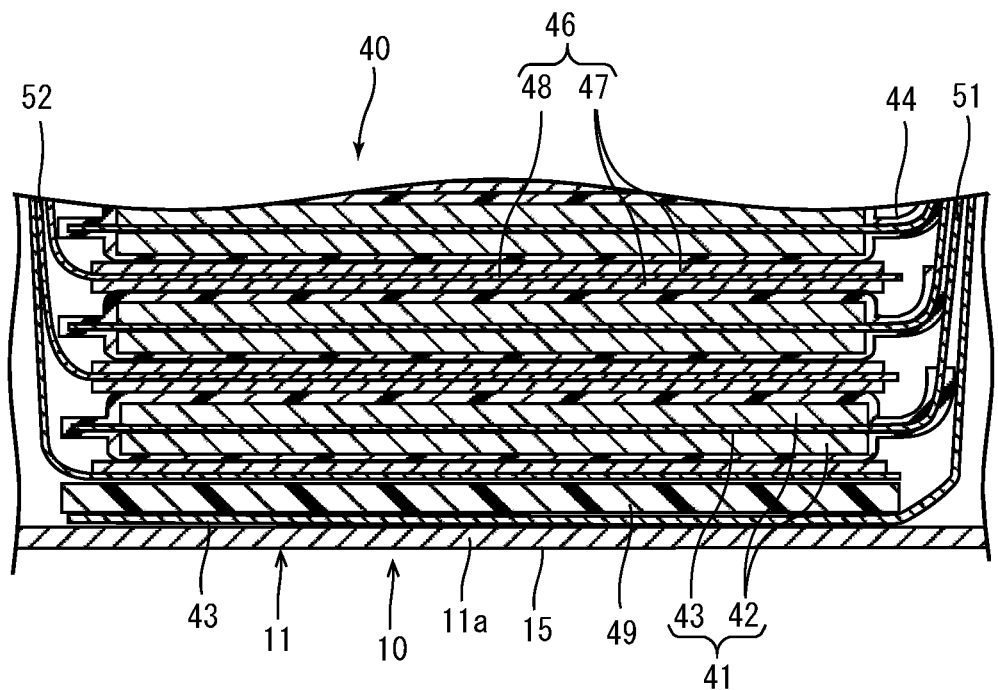
FIG. 4 is an enlarged cross-sectional view which illustrates the configuration of an electrode body in an enlarged manner.

FIG. 4 is an enlarged cross-sectional view that illustrates the detailed configuration of the electrode body 40. The electrode body 40 includes a plurality of substantially disc-shaped positive electrodes 41 which are housed inside bag-like separators 44, and a plurality of substantially disc-shaped negative electrodes 46, which are alternately stacked in the thickness direction. Thus, the electrode body 40 as a whole has the shape of a substantially cylindrical column that extends in one direction. Further, in the electrode body 40, the plurality of positive electrodes 41 and the plurality of negative electrodes 46 are stacked so that one negative electrode is provided at both end faces in the one direction.

Figure 5:
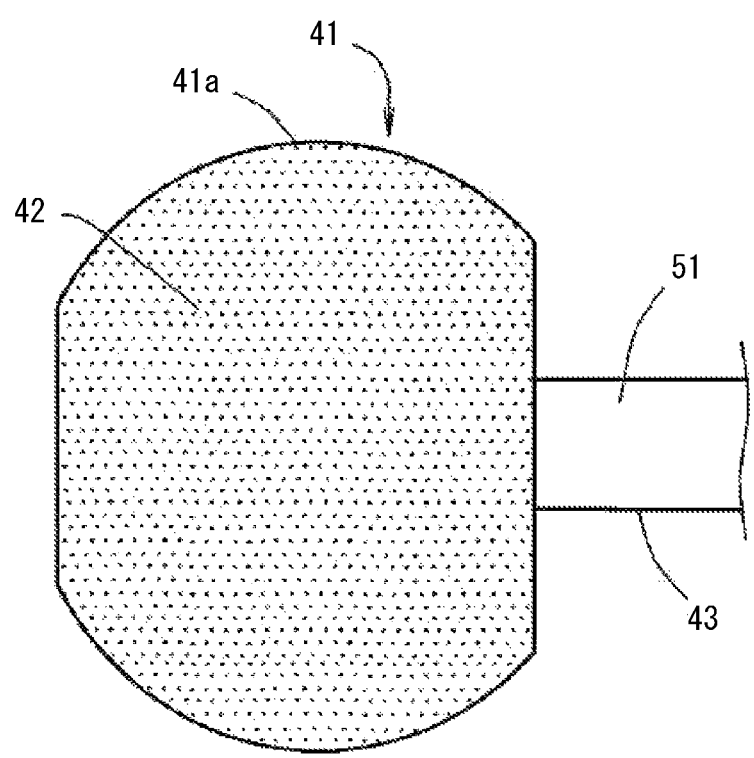
FIG. 5 is a plan view illustrating the schematic configuration of a positive electrode.

FIG. 5 is a plan view illustrating the schematic configuration of the positive electrode 41. As illustrated in FIG. 4 and FIG. 5, the positive electrode 41 is a component in which, for example, a positive electrode active material layer 42 containing a positive electrode active material such as lithium cobalt oxide is provided on both surfaces of a positive electrode collector 43 made of a metal foil such as aluminum. As illustrated in FIG. 5, the positive electrode 41 has a positive electrode main body portion 41a in which the positive electrode active material layer 42 is formed on each of the two surfaces of the positive electrode collector 43, and a positive electrode lead 51 that protrudes from the positive electrode main body portion 41a and which has a narrower width than the positive electrode main body portion 41a.

Figure 6:
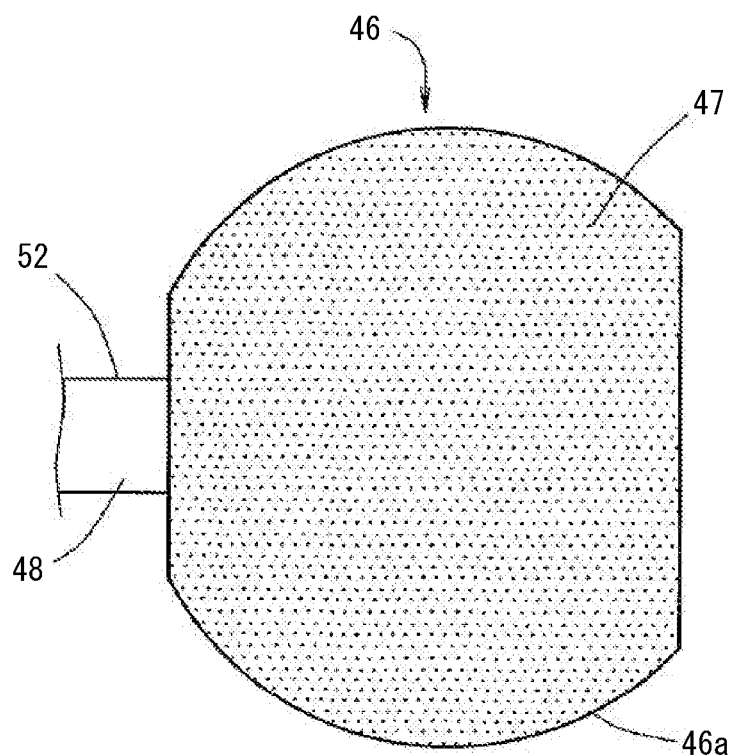
FIG. 6 is a plan view illustrating the schematic configuration of a negative electrode.

FIG. 6 is a plan view illustrating a schematic configuration of the negative electrode 46. As illustrated in FIG. 4 and FIG. 6, the negative electrode 46 is a component in which a negative electrode active material layer 47 containing a negative electrode active material such as graphite is provided on both surfaces or one surface of a negative electrode collector 48 made of a metal foil such as copper. As illustrated in FIG. 6, the negative electrode 46 has a negative electrode main body portion 46a in which the negative electrode active material layer 47 is formed on both surfaces or one surface of the negative electrode collector 48, and a negative electrode lead 52 that protrudes from the negative electrode main body portion 46a and which has a narrower width than the negative electrode main body portion 46a.

Among the negative electrodes 46, the negative electrodes 46 that are positioned at the two ends in the axial direction of the electrode body 40 which has a substantially cylindrical shape have the negative electrode active material layer 47 only on one surface side of the corresponding negative electrode collector 48, so that the negative electrode collectors 48, 48 are positioned at the end portions in the axial direction of the electrode body 40. That is, the negative electrode collectors 48, 48 are exposed at both ends of the electrode body 40 that has a substantially cylindrical shape. One of these negative electrode collectors 48 of the electrode body 40 is positioned on the positive electrode can-side bottom face portion 11 of the positive electrode can 10 via the positive electrode collector 43 and an insulating sheet 49. In a state in which the electrode body 40 is arranged between the positive electrode can 10 and the negative electrode can 20, the other negative electrode collector 48 of the electrode body 40 contacts the negative electrode can-side bottom face portion 21 of the negative electrode can 20 (see FIG. 3).

The separator 44 is a bag-like member formed in a circular shape in plan view, and is formed in a size that is capable of accommodating the substantially disc-shaped positive electrode 41. The separator 44 is composed of a microporous thin film made of polyethylene that is excellent in insulating properties. Forming the separator 44 using a microporous thin film in this manner allows lithium ions to pass through the separator 44. The separator 44 is formed by wrapping one rectangular sheet of microporous thin film around the positive electrode 41, and bonding together overlapping portions of the sheet material by thermal welding or the like.

As illustrated in FIG. 3 and FIG. 4, the positive electrode lead 51 which is conductive and which extends outward from the positive electrode collector 43 in plan view is formed integrally with the positive electrode collector 43 of the positive electrode 41. The positive electrode collector 43 side of the positive electrode lead 51 is also covered by the separator 44. Note that, the positive electrode collector 43 in which the positive electrode active material layer 42 is not provided is arranged between the insulating sheet 49 and the positive electrode can-side bottom face portion 11 of the positive electrode can 10. That is, the positive electrode collector 43 electrically contacts the positive electrode can-side bottom face portion 11 of the positive electrode can 10.

The negative electrode lead 52 which is conductive and which extends outward from the negative electrode collector 48 in plan view is formed integrally with the negative electrode collector 48 of the negative electrode 46.

As illustrated in FIG. 3 and FIG. 4, the positive electrodes 41 and the negative electrodes 46 are stacked in the radial direction of the flat battery 2 so that the positive electrode leads 51 of the respective positive electrodes 41 are located on one side, and the negative electrode leads 52 of the respective negative electrodes 46 are located on the opposite side to the positive electrode leads 51.

In a state in which a plurality of the positive electrodes 41 and the negative electrodes 46 are stacked in the thickness direction as mentioned above, the tip sides of the plurality of positive electrode leads 51 are superposed in the thickness direction and connected by ultrasonic welding or the like. Thereby, the plurality of positive electrodes 41 are electrically connected to each other through the plurality of positive electrode leads 51, and each of the positive electrodes 41 and the positive electrode can 10 are electrically connected. On the other hand, the tip sides of the plurality of negative electrode leads 52 are also superposed in the thickness direction and connected to each other by ultrasonic welding or the like. Thereby, the plurality of negative electrodes 46 are electrically connected to each other through the plurality of negative electrode leads 52, and each of the negative electrodes 46 and the negative electrode can 20 are electrically connected.

(External terminal)

Figure 7:
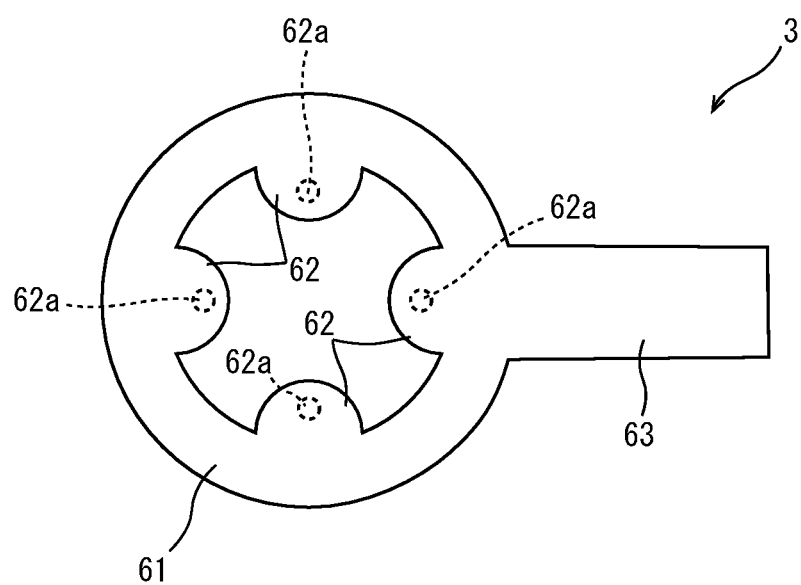
FIG. 7 is a plan view illustrating the schematic configuration of an external electrode.

Next, the configuration of the external terminal 3 will be described. FIG. 7 is a plan view illustrating a schematic configuration of the external terminal 3. As illustrated in FIG. 1 to FIG. 3, with respect to the flat battery 2, the external terminals 3 are attached by welding to the mounting portion 11a of the positive electrode can-side bottom face portion 11 of the positive electrode can 10, and the negative electrode can-side bottom face portion 21 of the negative electrode can 20, respectively. That is, as illustrated in FIG. 2, a pair of external terminals 3 are attached to the flat battery 2 so as to sandwich the flat battery 2 in the thickness direction. Note that, in the present embodiment, the pair of external terminals 3 that are attached by welding to the mounting portion 11a of the positive electrode can 10 and the negative electrode can-side bottom face portion 21 of the negative electrode can 20, respectively, have the same shape.

Each external terminal 3 is, for example, a plate-like member made of stainless steel, and is attached by welding to the flat battery 2. The external terminals 3 are electrically connected to an unshown device. Thereby, electric power of the flat battery 2 is supplied to the device through the external terminals 3.

As illustrated in FIG. 7, the external terminal 3 includes an outer circumferential portion 61 having an annular shape, a plurality of protruding portions 62 formed so as to protrude inward from the inner circumferential side of the outer circumferential portion 61, and a connection portion 63 formed so as to protrude outward from the outer circumferential side of the outer circumferential portion 61. In the external terminal 3, the outer circumferential portion 61, the protruding portions 62 and the connection portion 63 are integrally formed. Note that, the outer circumferential portion 61, the protruding portions 62 and the connection portion 63 may be formed as separate elements and connected to each other.

With respect to the negative electrode can-side mounting face 25, the outer circumferential portion 61 is formed so as to overlap with a region that, with respect to the distance from the center to the outer edge of the portion constituting the negative electrode can-side mounting face 25 when viewed in the axial direction, is on an outer side relative to a position located at a distance from the center that is one-half of the aforementioned distance from the center to the outer edge, and so as not to overlap with a region on an inner side relative to the position located at a distance that is one-half of the aforementioned distance from the center. In the present embodiment, as illustrated in FIG. 1, the outer circumferential portion 61 is formed so as to follow the outer shape of the negative electrode can-side bottom face portion 21 of the negative electrode can 20 when viewed in the axial direction of the flat battery 2 (normal line direction of the negative electrode can-side mounting face 25). In the present embodiment, the outer diameter of the negative electrode can-side bottom face portion 21 of the negative electrode can 20 and the outer diameter of the negative electrode can-side mounting face 25 to which the external terminal 3 is attached are equal. Hence, the outer circumferential portion 61 is formed so as to follow the outer shape of the negative electrode can-side mounting face 25.

As described above, in the present embodiment the outer diameter of the negative electrode can-side bottom face portion 21 and the outer diameter of the mounting portion 11a of the positive electrode can-side bottom face portion 11 of the positive electrode can 10 are equal. Hence, with respect to the positive electrode can-side mounting face 15 of the mounting portion 11a, the outer circumferential portion 61 is formed so as to overlap with a region that, with respect to the distance from the center to the outer edge of the portion constituting the negative electrode can-side mounting face 25 when viewed in the axial direction, is on an outer side relative to a position located at a distance from the center that is one-half of the aforementioned distance from the center to the outer edge, and so as not to overlap with a region on an inner side relative to the position located at a distance that is one-half of the aforementioned distance from the center. That is, in the present embodiment, the outer circumferential portion 61 is formed so as to also follow the outer shape of the mounting portion 11a of the positive electrode can-side bottom face portion 11 of the positive electrode can 10 when viewed in the axial direction of the flat battery 2 (normal line direction of the positive electrode can-side mounting face 15). In the present embodiment, the outer diameter of the mounting portion 11a and the outer diameter of the positive electrode can-side mounting face 15 to which the external terminal 3 is attached are equal. Hence, the outer circumferential portion 61 is formed so as to follow the outer shape of the positive electrode can-side mounting face 15.

That is, the outer circumferential portion 61 is formed so as to follow the outer shape of the negative electrode can-side mounting face 25 and the positive electrode can-side mounting face 15.

In this case, the phrase "the outer circumferential portion 61 follows the outer shape of the negative electrode can-side mounting face 25 and the positive electrode can-side mounting face 15" means that the shape of the outer circumferential side of the outer circumferential portion 61 is approximately identical to the outer shape of the negative electrode can-side mounting face 25 and the outer shape of the positive electrode can-side mounting face 15.

Note that, the outer diameter of the outer circumferential portion 61 may be somewhat larger or somewhat smaller than the outer diameter of at least one of the negative electrode can-side mounting face 25 and the positive electrode can-side mounting face 15. That is, when viewed in the axial direction of the flat battery 2 (normal line direction of the negative electrode can-side mounting face 25), the outer edge of the outer circumferential portion 61 and the outer edge of the negative electrode can-side mounting face 25 need not overlap with each other, and the outer edge of the outer circumferential portion 61 and the outer edge of the positive electrode can-side mounting face 15 need not overlap with each other.

The protruding portion 62 is formed so as to protrude inward from the inner circumferential side of the outer circumferential portion 61 as viewed in the axial direction of the flat battery 2 (normal line direction of the negative electrode can-side mounting face 25). In the present embodiment, the protruding portion 62 has a semicircular outer shape in plan view. Further, the protruding portion 62 is provided at a plurality of places (four places in the present embodiment) on the inner circumferential side of the outer circumferential portion 61. Specifically, a plurality of the protruding portions 62 are provided at 90-degree intervals on the inner circumferential side of the outer circumferential portion 61. Hence, pairs of protruding portions 62 among the plurality of protruding portions 62 are provided at positions that face each other in the radial direction of the outer circumferential portion 61, on the inner circumferential side of the outer circumferential portion 61. Note that, an interval at which the plurality of protruding portions 62 are formed may be an interval other than 90 degrees.

The protruding portions 62 are provided so as to extend toward the center of the flat battery 2 as viewed in the axial direction. Further, as illustrated in FIG. 1 and FIG. 3, with respect to the negative electrode can-side mounting face 25, the protruding portions 62 do not overlap with a region that, when viewed in the normal line direction of the negative electrode can-side mounting face 25, is located on the inner side of a position that, with respect to the distance from the center to the outer edge of the portion constituting the negative electrode can-side mounting face 25, is located at a distance from the center that is one-third of the aforementioned distance from the center to the outer edge. Similarly, with respect to the positive electrode can-side mounting face 15, the protruding portions 62 do not overlap with a region that, when viewed in the normal line direction of the positive electrode can-side mounting face 15, is located on the inner side of a position that, with respect to the distance from the center to the outer edge of the portion constituting the positive electrode can-side mounting face 15, is located at a distance from the center that is one-third of the aforementioned distance from the center to the outer edge.

As illustrated in FIG. 1 and FIG. 3, the protruding portions 62 are welded to the flat battery 2. Specifically, in the external terminal 3 that is attached to the positive electrode can 10, the protruding portions 62 are welded to the positive electrode can-side mounting face 15 of the mounting portion 11a of the positive electrode can-side bottom face portion 11. In the external terminal 3 that is attached to the negative electrode can 20, the protruding portions 62 are welded to the negative electrode can-side mounting face 25 of the negative electrode can-side bottom face portion 21. That is, each protruding portion 62 has a welded part 62a that is welded to the flat battery 2.

In a case where the flat battery 2 deforms as described later, the protruding portions 62 deform so as to follow deformation of the positive electrode can-side bottom face portion 11 and the negative electrode can-side bottom face portion 21. Thereby, a gap between the protruding portions 62 and the positive electrode can-side mounting face 15 of the positive electrode can-side bottom face portion 11 and a gap between the protruding portions 62 and the negative electrode can-side mounting face 25 of the negative electrode can-side bottom face portion 21 can be reduced in comparison to a gap that arises at a welding portion between an external terminal and a flat battery according to the conventional configuration. Hence, because it is not necessary to press down the vicinity of a welding position when welding the flat battery and the external terminal together, the welding workability can be improved.

As illustrated in FIG. 1 to FIG. 3 and FIG. 7, the connection portion 63 is formed so as to protrude outward in the radial direction of the outer circumferential portion 61 from the outer circumferential side of the outer circumferential portion 61. That is, the center of the outer circumferential portion 61 is positioned on an extension line in the extending direction of the connection portion 63. In the present embodiment, the connection portion 63 is connected to the outer circumferential side of the outer circumferential portion 61 at a portion thereof at which the protruding portion 62 is provided. The connection portion 63 has a rectangular shape that is long in the extending direction thereof in plan view. The connection portion 63 is electrically connected to an unshown device. Thereby, the connection portion 63 electrically connects the outer circumferential portion 61 and the device.

Note that, the connection portion 63 may have a shape other than a rectangular shape in plan view. Further, the connection portion 63 may protrude in a direction other than the radial direction of the outer circumferential portion 61. The connection portion 63 may also be connected to the outer circumferential side of the outer circumferential portion 61 at a portion thereof that is other than a portion at which the protruding portion 62 is provided. That is, the center of the outer circumferential portion 61 need not be located on an extension line in the extending direction of the connection portion 63. This similarly applies with respect to connection portions in the respective forms that are described hereunder.

(Relation Between Deformation of Flat Battery and External Terminals)

Next, the relation between deformation of the flat battery 2 and the external terminals 3 will be described.

Figure 8:
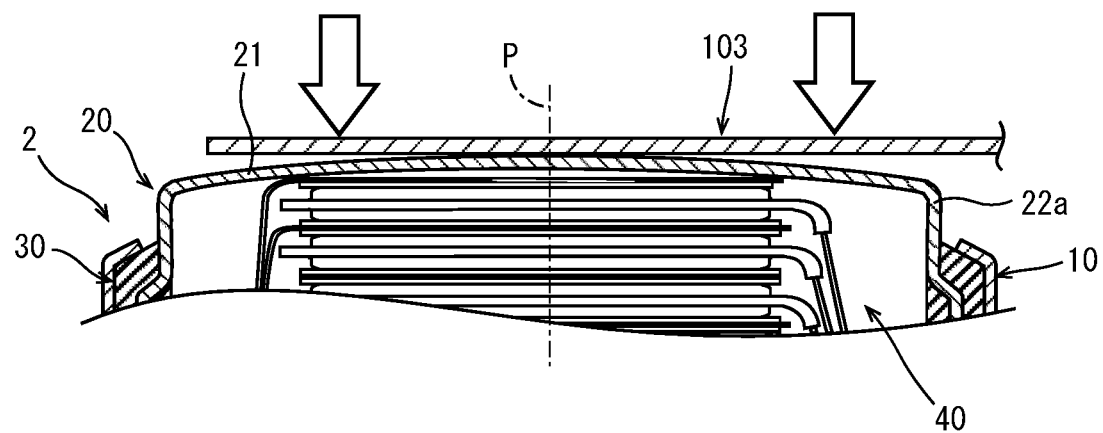
FIG. 8 is a cross-sectional view that schematically illustrates the manner in which a deformed negative electrode can and a conventional band-like external electrode come in contact.
Figure 9:
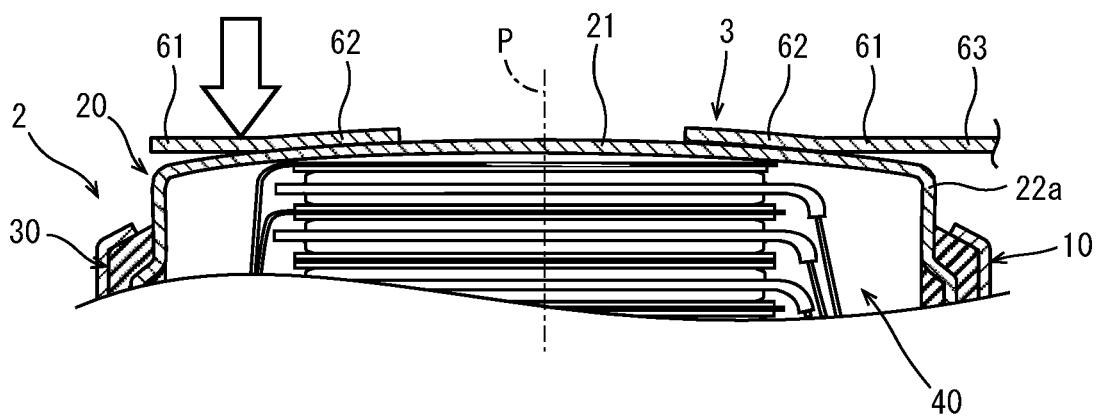
FIG. 9 is a cross-sectional view that schematically illustrates the manner in which a deformed negative electrode can and an external terminal according to Embodiment 1 come in contact.

As described later, after assembling the battery, the flat battery 2 is subjected to a formation process. Because expansion of the electrode body 40 and generation of gas and the like within the flat battery 2 is caused by the formation process, deformation of the positive electrode can 10 and the negative electrode can 20 occurs whereby the positive electrode can 10 and the negative electrode can 20 swell outward, respectively. Because the positive electrode can 10 and the negative electrode can 20 undergo the same kind of deformation, hereunder only the deformation of the negative electrode can 20 is described. In FIG. 8 and FIG. 9, deformation of the negative electrode can 20 of the flat battery 2 is schematically illustrated. Note that, for description purposes, deformation of the negative electrode can 20 is illustrated in an exaggerated manner in FIG. 8 and FIG. 9.

As illustrated in FIG. 8 and FIG. 9, after formation of the flat battery 2 is performed, the negative electrode can-side bottom face portion 21 of the negative electrode can 20 deforms such that the negative electrode can-side bottom face portion 21 swells outward in the axial direction of the flat battery 2. When the negative electrode can-side bottom face portion 21 of the negative electrode can 20 is viewed in the axial direction (when viewed in the normal line direction of the negative electrode can-side mounting face 25), the deformation amount is greatest at the center of the negative electrode can-side bottom face portion 21.

In the case of attaching a conventional band-like external terminal 103 (case illustrated in FIG. 8) to the negative electrode can-side bottom face portion 21 of the negative electrode can 20 in which deformation occurs as illustrated in FIG. 8 and FIG. 9, the external terminal 103 and the negative electrode can-side bottom face portion 21 contact at one point, and a gap arises therebetween at portions other than at the contact portion.

In general, when taking into consideration the welding strength and the positioning of the external terminal, welding between a battery and a band-like external terminal is preferably performed at a plurality of places. Hence, in a case where deformation occurs in the negative electrode can-side bottom face portion 21 of the negative electrode can 20 as illustrated in FIG. 8, it is necessary to perform welding at a plurality of places in a state in which the band-like external terminal 103 is pressed against the negative electrode can-side bottom face portion 21 so as to cause the band-like external terminal 103 to follow the outer shape of the negative electrode can-side bottom face portion 21. At this time, because there is a necessity to press down the external terminal 103 at least at two places (see the outline arrows in FIG. 8) so that the external terminal 103 and the negative electrode can-side bottom face portion 21 of the negative electrode can 20 contact at a position at which welding is to be performed, when welding at a plurality of places, each time the welding position is changed, it is necessary to change the positions that are pressed down. Furthermore, because the external terminal 103 is caused to follow the outer shape of the negative electrode can-side bottom face portion 21 by welding together the external terminal 103 and the negative electrode can-side bottom face portion 21 of the negative electrode can 20, a force is liable to be applied to the welded part.

In contrast, by the external terminal 3 having the protruding portions 62 on the inner circumferential side of the annular outer circumferential portion 61 in the manner described in the present embodiment, as illustrated in FIG. 9, the protruding portions 62 easily deform so as to follow the outer shape of the negative electrode can-side bottom face portion 21 of the negative electrode can 20. Hence, by pressing down the outer circumferential portion 61 of the external terminal 3 at an arbitrary position with respect to the negative electrode can-side bottom face portion 21 of the negative electrode can 20, the protruding portions 62 can easily be caused to follow the outer shape of the negative electrode can-side bottom face portion 21. Thus, the protruding portions 62 can be easily welded to the negative electrode can-side bottom face portion 21. Therefore, the welding workability when welding together the external terminal 3 and the negative electrode can-side bottom face portion 21 of the negative electrode can 20 can be improved.

Furthermore, as mentioned above, because the protruding portions 62 of the external terminal 3 deform so as to follow the outer shape of the negative electrode can-side bottom face portion 21 of the negative electrode can 20, it is difficult for a force to arise at welding portions between the protruding portions 62 and the negative electrode can-side bottom face portion 21. Thus, even in a case in which the negative electrode can-side bottom face portion 21 of the negative electrode can 20 deforms due to charging and discharging of the flat battery 2 or the like, the generation of a large force at a welding portion between the external terminal 3 and the negative electrode can-side bottom face portion 21 of the negative electrode can 20 can be prevented.

Note that although a case of performing welding of the external terminal 3 and the negative electrode can 20 is described in the foregoing, the above description similarly applies to a case of welding together the external terminal 3 and the positive electrode can 10.

(Method for Manufacturing Battery with External Terminals)

Next, a method for manufacturing the battery with external terminals 1 having the aforementioned configuration will be described.

First, the positive electrode can 10 and the negative electrode can 20 that each have a bottomed cylindrical shape are formed by press-forming, respectively. The gasket 30 that is made of a resin material using a forming mold or the like is formed on the side-wall portion 22 of the negative electrode can 20.

On the other hand, a plurality of plate-like positive electrodes 41 that are covered by the separators 44, and a plurality of plate-like negative electrodes 46 are stacked in the thickness direction to form the electrode body 40 having a substantially cylindrical shape as illustrated in FIG. 3. Since the electrode body 40 is manufactured by a method that is similar to the conventional method, a detailed description of the manufacturing method is omitted here.

The electrode body 40 is arranged together with the insulating sheet 49 and the like inside the positive electrode can 10, and a non-aqueous electrolyte is injected therein. The negative electrode can 20 is then arranged so as to cover an opening of the positive electrode can 10. In this state, the peripheral wall portion 12 of the positive electrode can 10 is pressed inward in the radial direction against the side-wall portion 22 of the negative electrode can 20 and is crimped thereto. At such time, the gasket 30 is sandwiched between the side-wall portion 22 of the negative electrode can 20 and the peripheral wall portion 12 of the positive electrode can 10. Thus, the flat battery 2 is obtained.

Thereafter, the obtained flat battery 2 is subjected to a formation process. At such time, the positive electrode can 10 and the negative electrode can 20 of the flat battery 2 deform in a manner such that the positive electrode can 10 and the negative electrode can 20 swell outward.

In a state in which the external terminals 3 are arranged on the mounting portion 11*a* of the positive electrode can-side bottom face portion 11 of the positive electrode can 10 and the negative electrode can-side bottom face portion 21 of the negative electrode can 20, respectively, in the flat battery 2 after the formation process, the protruding portions 62 of the external terminals 3 are welded by laser welding to the mounting portion 11*a* and the negative electrode can-side bottom face portion 21.

Because the external terminals 3 of the present embodiment have the protruding portions 62 on the inner circumferential side of the annular outer circumferential portion 61, the protruding portions 62 can be caused to follow the shapes of the mounting portion 11*a* of the positive electrode can 10 and the negative electrode can-side bottom face portion 21 of the negative electrode can 20 that deformed after formation, respectively. Thus, there is no necessity to adjust the positions at which to press down the external terminals 103 and to press down the external terminals 103 at a plurality of places as in the case of the conventional band-like external terminal 103. Hence, the welding workability when welding the external terminals 3 and the flat battery 2 together can be improved.

In particular, in the present embodiment, because the protruding portions 62 of the external terminals 3 are welded by laser welding to the mounting portion 11*a* and the negative electrode can-side bottom face portion 21, if a gap were to arise at welding portions between the external terminals 3 and the flat battery 2, only the external terminals 3 would be excessively heated by a laser beam and a phenomenon such as spattering would occur. In such a case, there is a possibility that adequate welding strength would not be obtained. Therefore, in the case of an external terminal having the conventional configuration, when performing laser welding it is necessary to press down the external terminal in the vicinity of a welding portion so that the aforementioned kind of gap does not arise. In contrast, by using the external terminal 3 of the present embodiment, because the protruding portions 62 can be caused to follow the outer shape of the mounting portion 11a of the positive electrode can 10 and the negative electrode can-side bottom face portion 21 of the negative electrode can 20, respectively, as described above, it is not necessary to press down the external terminal 3 in the vicinity of a welding portion and at a plurality of places. Thus, the configuration of the present embodiment is effective in the case of welding the external terminals 3 to the flat battery 2 by laser welding.

Further, because the outer circumferential portion 61 of the external terminal 3 is formed in an annular shape so as to follow the outer shape of the mounting portion 11a of the positive electrode can 10 and the outer shape of the negative electrode can 20, respectively, the external terminals 3 can be easily positioned with respect to the positive electrode can 10 and the negative electrode can 20. Thus, the welding workability when welding the external terminals 3 and the flat battery 2 together can be further improved.

In addition, as mentioned above, because the protruding portions 62 of the external terminal 3 deform so as to follow the outer shape of the negative electrode can-side bottom face portion 21 of the negative electrode can 20, it is difficult for a force to arise at welding portions between the protruding portions 62 and the negative electrode can-side bottom face portion 21. Thus, even in a case in which the negative electrode can-side bottom face portion 21 of the negative electrode can 20 deforms due to charging and discharging of the flat battery 2 or the like, the generation of a large force at a welding portion between the external terminal 3 and the negative electrode can-side bottom face portion 21 of the negative electrode can 20 can be prevented. Similarly, in the external terminal 3 that is attached by welding to the mounting portion 11a of the positive electrode can 10 also, it is difficult for a force to arise at welding portions between the protruding portions 62 and the mounting portion 11a. Thus, even in a case where deformation occurs at the mounting portion 11a of the positive electrode can 10, a large force can be prevented from arising at the welding portions.

Further, as mentioned above, each external terminal 3 has the annular outer circumferential portion 61, and the protruding portions 62 that are formed so as to protrude inward from the inner circumferential side of the outer circumferential portion 61. However, with respect to the negative electrode can-side mounting face 25, the protruding portions 62 do not overlap with a region that is on the inward side relative to a position located at a distance from the center that is one-third of the distance from the center to the outer edge of the portion constituting the negative electrode can-side mounting face 25. Further, with respect to the positive electrode can-side mounting face 15, the protruding portions 62 do not overlap with a region that is on the inward side relative to a position located at a distance from the center that is one-third of the distance from the center to the outer edge of the portion constituting the positive electrode can-side mounting face 15. Thereby, because the protruding portions 62 are not located on the center portion at which deformation is greatest in the flat battery 2 after formation, the thickness of the protruding portions 62 does not influence the thickness (maximum thickness) of the overall battery, or if such influence exists, the influence is small. Hence, an increase in the dimension in the thickness direction of the battery with external terminals 1 can be suppressed.

Furthermore, because the center portion of the flat battery 2 is exposed, it is possible to perform readable engraving or the like at the center portion.

The configuration of the present embodiment is particularly useful in a case where the flat battery 2 is a secondary battery. That is, in a case where the flat battery 2 is a secondary battery, in general, in comparison to a primary battery, a voltage that is applied after battery assembly is high, and in addition, the volume expansion of the electrode body is large and the generated amount of gas is also large. Therefore, in the case of a secondary battery, deformation after formation is large in comparison to a primary battery. That is, in the case of a secondary battery, the deformation amount of a mounting face to which an external terminal is to be attached is large compared to a primary battery. Furthermore, after the external terminals 3 are attached to the secondary battery by welding, because expansion and contraction of the secondary battery are repeated due to charging and discharging of the secondary battery, a comparatively large force is applied to the welding portions between the external terminals 3 and the secondary battery.

In contrast, by adopting the configuration of the present embodiment, since the protruding portions 62 of the external terminals 3 deform so as to follow deformation of the mounting portion 11a of the positive electrode can 10 and the negative electrode can-side bottom face portion 21 of the negative electrode can 20 of the flat battery 2, the external terminals 3 and the flat battery 2 can easily be welded together.

<Modification 1 of Embodiment 1>

Figure 10:
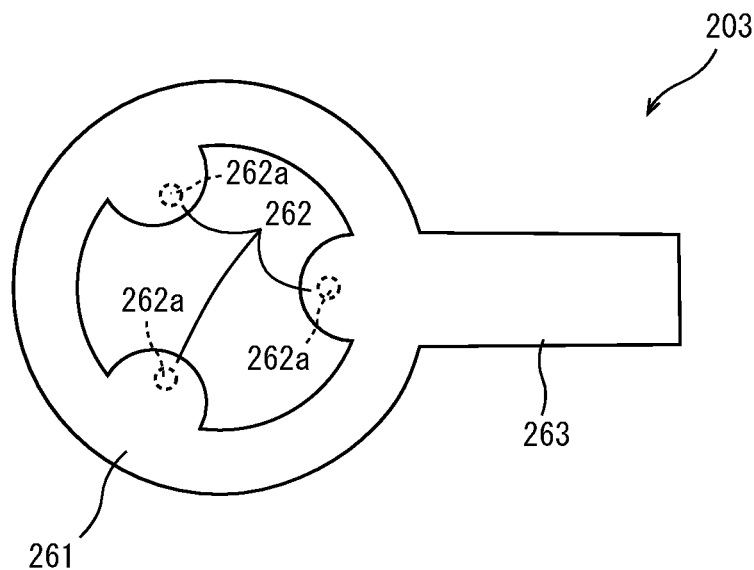
FIG. 10 is a view corresponding to FIG. 7 that illustrates a schematic configuration of an external terminal according to Modification 1 of Embodiment 1.

FIG. 10 illustrates a schematic configuration of an external terminal 203 according to Modification 1 of Embodiment 1. As illustrated in FIG. 10, the external terminal 203 has three protruding portions 262 on an inner circumferential side of an outer circumferential portion 261. In the case illustrated in FIG. 10, the three protruding portions 262 are provided at 120-degree intervals in the circumferential direction of the outer circumferential portion 261. Note that, the positions at which the three protruding portions 262 are provided are not limited to positions that are at 120-degree intervals in the circumferential direction of the outer circumferential portion 261, and may be other positions.

Similarly to Embodiment 1, the three protruding portions 262 are welded to the mounting portion 11a of the positive electrode can 10 and the negative electrode can-side bottom face portion 21 of the negative electrode can 20 of the flat battery 2, respectively. That is, each of the three protruding portions 262 has a welded part 262a.

Note that, in FIG. 10, reference numeral 263 denotes a connection portion.

<Modification 2 of Embodiment 1>

Figure 11:
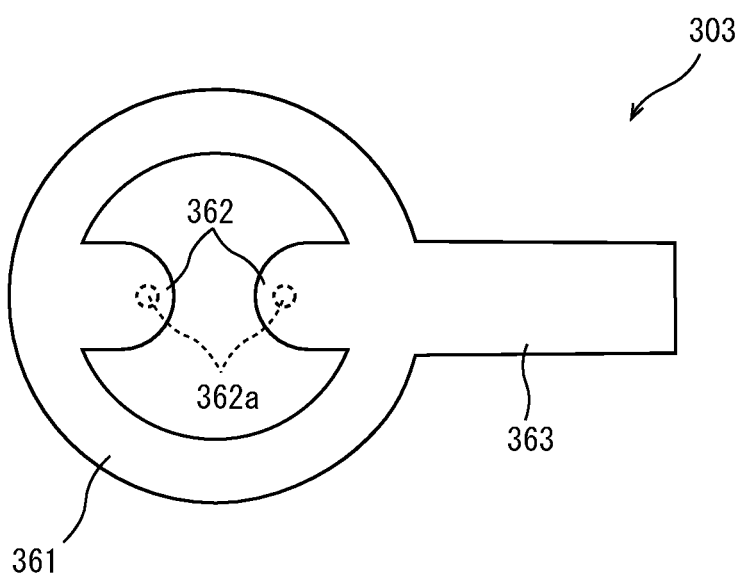
FIG. 11 is a view corresponding to FIG. 7 that illustrates a schematic configuration of an external terminal according to Modification 2 of Embodiment 1.

FIG. 11 illustrates a schematic configuration of an external terminal 303 according to Modification 2 of Embodiment 1. As illustrated in FIG. 11, the external terminal 303 has two protruding portions 362 on an inner circumferential side of an outer circumferential portion 361. In the case illustrated in FIG. 11, the two protruding portions 362 are provided at 180-degree intervals in the circumferential direction of the outer circumferential portion 361. That is, the two protruding portions 362 are provided at positions facing each other in the radial direction of the outer circumferential portion 361 on the inner circumferential side of the outer circumferential portion 361. Note that, the positions at which the two protruding portions 362 are provided are not limited to positions that are at 180-degree intervals in the circumferential direction of the outer circumferential portion 361, and may be other positions.

The length by which the protruding portions 362 protrude toward the inward side of the outer circumferential portion 361 is greater than in the case of the protruding portions 62 of Embodiment 1. In Modification 2, with respect to the negative electrode can-side mounting face 25 of the flat battery 2, the protruding portions 362 do not overlap with a region which is on the inward side relative to a position located at a distance from the center that is approximately one-fifth of the distance from the center to the outer edge of the portion constituting the negative electrode can-side mounting face 25. Similarly, the protruding portions 362 do not overlap with a region which is on the inward side relative to a position located at a distance from the center that is approximately one-fifth of the distance from the center to the outer edge of the portion constituting the positive electrode can-side mounting face 15 of the flat battery 2. Thus, it is possible to perform readable engraving or the like at an exposed portion at the center of the negative electrode can-side mounting face 25 and an exposed portion at the center of the positive electrode can-side mounting face 15.

Note that, similarly to Embodiment 1, a tip portion in the protruding direction of each protruding portion 362 is semicircular in plan view.

Similarly to Embodiment 1, two protruding portions 362 are welded to the mounting portion 11a of the positive electrode can 10 and the negative electrode can-side bottom face portion 21 of the negative electrode can 20 of the flat battery 2, respectively. That is, each of the two protruding portions 362 has a welded part 362a. As mentioned above, the length by which the protruding portions 362 protrude toward the inward side of the outer circumferential portion 361 is greater than in the case of the protruding portions 62 of Embodiment 1, and therefore the degree of freedom with regard to the welding positions of the protruding portions 362 (positions of welded parts 362a) is high in comparison to the configuration of Embodiment 1.

Note that, in FIG. 11, reference numeral 363 denotes a connection portion.

<Modification 3 of Embodiment 1>

Figure 12:
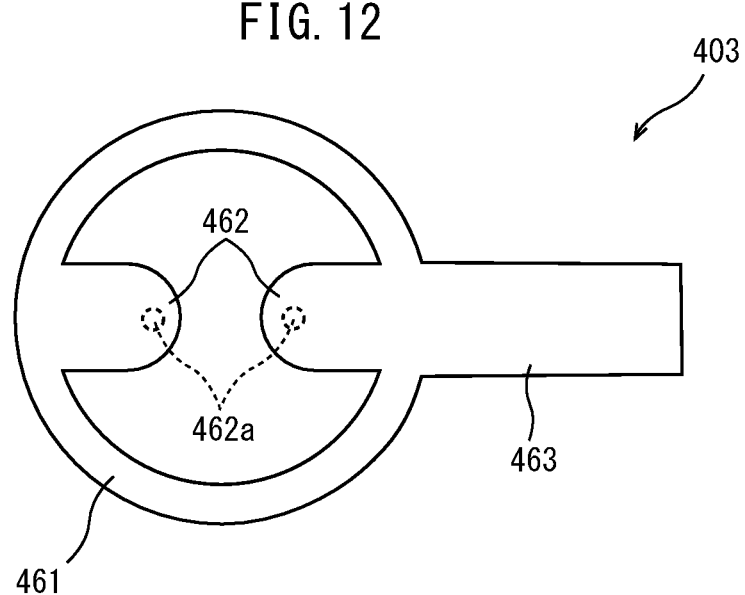
FIG. 12 is a view corresponding to FIG. 7 that illustrates a schematic configuration of an external terminal according to Modification 3 of Embodiment 1.

FIG. 12 illustrates a schematic configuration of an external terminal 403 according to Modification 3 of Embodiment 1. As illustrated in FIG. 12, similarly to Modification 2, the external terminal 403 has two protruding portions 462 on the inner circumferential side of an outer circumferential portion 461. In the case illustrated in FIG. 12 also, the two protruding portions 462 are provided at 180-degree intervals in the circumferential direction of the outer circumferential portion 461. That is, the two protruding portions 462 are provided at positions facing each other in the radial direction of the outer circumferential portion 461 on the inner circumferential side of the outer circumferential portion 461. Note that, the positions at which the two protruding portions 462 are provided are not limited to positions that are at 180-degree intervals in the circumferential direction of the outer circumferential portion 461, and may be other positions.

The inner diameter of the outer circumferential portion 461 is larger in comparison to the configuration of Modification 2. That is, the distance (width in the radial direction) between the inner circumferential side and the outer circumferential side of the outer circumferential portion 461 is smaller in comparison to the configuration of Modification 2. Thereby, with respect to the positive electrode can-side bottom face portion 11 of the positive electrode can 10 and the negative electrode can-side bottom face portion 21 of the negative electrode can 20 of the flat battery 2, the outer circumferential portion 461 can be arranged on the outer circumferential side at which deformation is less. Hence, the external terminal 403 can be arranged more stably with respect to the positive electrode can-side bottom face portion 11 of the positive electrode can 10 and the negative electrode can-side bottom face portion 21 of the negative electrode can 20 of the flat battery 2.

The length by which the protruding portions 462 protrude toward the inward side of the outer circumferential portion 461 is greater than in the case of the protruding portions 62 of Embodiment 1. The positions of the respective tips in the protruding direction of the protruding portions 462 in plan view are the same as the positions of the respective tips in the protruding direction of the protruding portions 362 in Modification 2. Hence, the protruding length of the respective protruding portions 462 is greater than the protruding length of the respective protruding portions 362 of Modification 2. Note that, the positions of the respective tips in the protruding direction of the protruding portions 462 may be different to the positions of the respective tips in the protruding direction of the protruding portions 362 in Modification 2. Further, the protruding length of the respective protruding portions 462 may be equal to or less than the protruding length of the respective protruding portions 362 of Modification 2. Even in such a case, readable engraving or the like can be performed at an exposed portion at which the protruding portions 462 are not located of at least one of the negative electrode can-side mounting face 25 and the positive electrode can-side mounting face 15.

Note that, similarly to Embodiment 1, a tip portion in the protruding direction of each protruding portion 462 is semicircular in plan view.

Similarly to Embodiment 1, two protruding portions 462 are welded to the mounting portion 11a of the positive electrode can 10 and the negative electrode can-side bottom face portion 21 of the negative electrode can 20 of the flat battery 2, respectively. That is, each of the two protruding portions 462 has a welded part 462a. As mentioned above, the length by which the protruding portions 462 protrude toward the inward side of the outer circumferential portion 461 is greater than in the case of the protruding portions 62 of Embodiment 1, and therefore the degree of freedom with regard to the welding positions of the protruding portions 462 (positions of welded parts 462a) is high in comparison to the configuration of Embodiment 1.

Note that, in FIG. 12, reference numeral 463 denotes a connection portion.

<Modification 4 of Embodiment 1>

Figure 13:
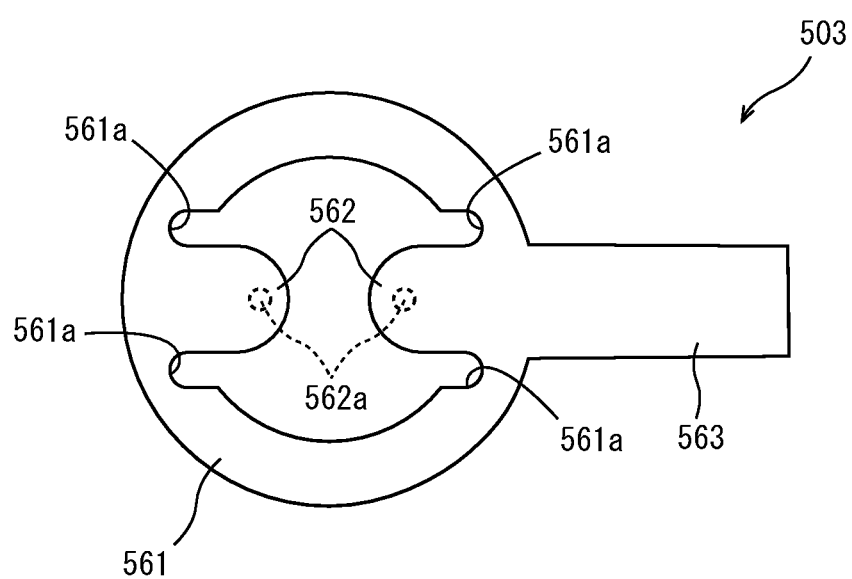
FIG. 13 is a view corresponding to FIG. 7 that illustrates a schematic configuration of an external terminal according to Modification 4 of Embodiment 1.

FIG. 13 illustrates a schematic configuration of an external terminal 503 according to Modification 4 of Embodiment 1. As illustrated in FIG. 13, similarly to Modifications 2 and 3, the external terminal 503 has two protruding portions 562 on the inner circumferential side of an outer circumferential portion 561. In the case illustrated in FIG. 13 also, the two protruding portions 562 are provided at 180-degree intervals in the circumferential direction of the outer circumferential portion 561. That is, the two protruding portions 562 are provided at positions facing each other in the radial direction of the outer circumferential portion 561 on the inner circumferential side of the outer circumferential portion 561. Note that, the positions at which the two protruding portions 562 are provided are not limited to positions that are at 180-degree intervals in the circumferential direction of the outer circumferential portion 561, and may be other positions.

The outer circumferential portion 561 has notch portions 561a at both sides of each of the protruding portions 562 in the circumferential direction. The notch portions 561a extend along the protruding direction of the corresponding protruding portion 562, with respect to the outer circumferential portion 561. In each of the notch portions 561a, a portion positioned on the base end side of the corresponding protruding portion 562 is semicircular in plan view. By providing the notch portions 561a having this shape in the outer circumferential portion 561, the protruding portions 562 can be easily deformed in the thickness direction of the external terminal 503. Hence, in comparison to the respective configurations of Embodiment 1 and the modifications thereof, the protruding portions 562 can more surely follow deformation of the mounting portion 11a of the positive electrode can 10 and deformation of the negative electrode can-side bottom face portion 21 of the negative electrode can 20 of the flat battery 2.

Note that, in this modification also, similarly to Embodiment 1, the tip portion in the protruding direction of each protruding portion 562 is semicircular in plan view. Further, readable engraving or the like can be performed at an exposed portion at the center of the negative electrode can-side mounting face 25 and of the positive electrode can-side mounting face 15.

Similarly to Embodiment 1, the two protruding portions 562 are each welded to the mounting portion 11a of the positive electrode can 10 and the negative electrode can-side bottom face portion 21 of the negative electrode can 20 of the flat battery 2. That is, the two protruding portions 562 each have a welded part 562a. As mentioned above, in the outer circumferential portion 561, the notch portions 561a are provided on both sides of each protruding portion 562 in the circumferential direction, and therefore the protruding portions 562 can be welded to the mounting portion 11a of the positive electrode can 10 and the negative electrode can-side bottom face portion 21 of the negative electrode can 20 in a state in which the protruding portions 562 have been caused to more closely follow deformation of the mounting portion 11a of the positive electrode can 10 and the negative electrode can-side bottom face portion 21 of the negative electrode can 20 of the flat battery 2. Consequently, the welding workability when welding together the external terminal 503 and the flat battery 2 can be further improved.

Note that, reference numeral 563 in FIG. 13 denotes a connection portion.

<Modification 5 of Embodiment 1>

Figure 14:
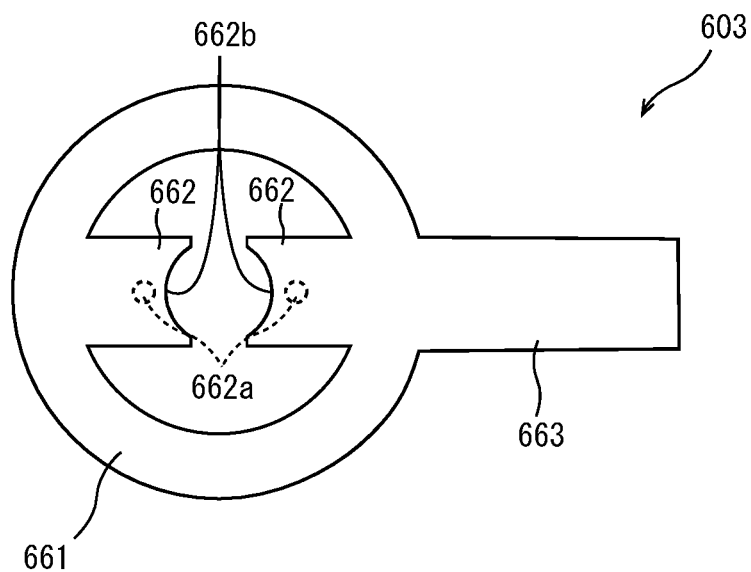
FIG. 14 is a view corresponding to FIG. 7 that illustrates a schematic configuration of an external terminal according to Modification 5 of Embodiment 1.

FIG. 14 illustrates a schematic configuration of an external terminal 603 according to Modification 5 of Embodiment 1. As illustrated in FIG. 14, similarly to Modifications 2 to 4, the external terminal 603 has two protruding portions 662 on the inner circumferential side of an outer circumferential portion 661. In the case illustrated in FIG. 14 also, the two protruding portions 662 are provided at 180-degree intervals in the circumferential direction of the outer circumferential portion 661. That is, the two protruding portions 662 are provided at positions facing each other in the radial direction of the outer circumferential portion 661 on the inner circumferential side of the outer circumferential portion 661. Note that, the positions at which the two protruding portions 662 are provided are not limited to positions that are at 180-degree intervals in the circumferential direction of the outer circumferential portion 661, and may be other positions.

In each of the protruding portions 662, a semicircular notch portion 662b that is outwardly concave in the radial direction of the outer circumferential portion 661 in plan view is provided at a tip portion that protrudes toward the inward side of the outer circumferential portion 661. Thereby, the tip portion of each of the protruding portions 662 can be caused to more closely follow the shape of the mounting portion 11a of the positive electrode can 10 and of the negative electrode can-side bottom face portion 21 of the negative electrode can 20 whose respective centers deform most as viewed in the axial direction of the flat battery 2.

Note that, in this modification also, readable engraving or the like can be performed at an exposed portion at the center of the negative electrode can-side mounting face 25 and of the positive electrode can-side mounting face 15.

Similarly to Embodiment 1, the two protruding portions 662 are each welded to the mounting portion 11a of the positive electrode can 10 and the negative electrode can-side bottom face portion 21 of the negative electrode can 20 of the flat battery 2. That is, the two protruding portions 662 each have a welded part 662a. As mentioned above, in each of the protruding portions 662, the semicircular notch portion 662b is provided in the tip portion in the protruding direction. Therefore, the protruding portions 662 can be welded to the mounting portion 11a of the positive electrode can 10 and the negative electrode can-side bottom face portion 21 of the negative electrode can 20 in a state in which the protruding portions 662 have been caused to more closely follow deformation of the mounting portion 11a of the positive electrode can 10 and the negative electrode can-side bottom face portion 21 of the negative electrode can 20 of the flat battery 2. Consequently, the welding workability when welding together the external terminal 603 and the flat battery 2 can be further improved.

Note that, reference numeral 663 in FIG. 14 denotes a connection portion.

<Modification 6 of Embodiment 1>

Figure 15:
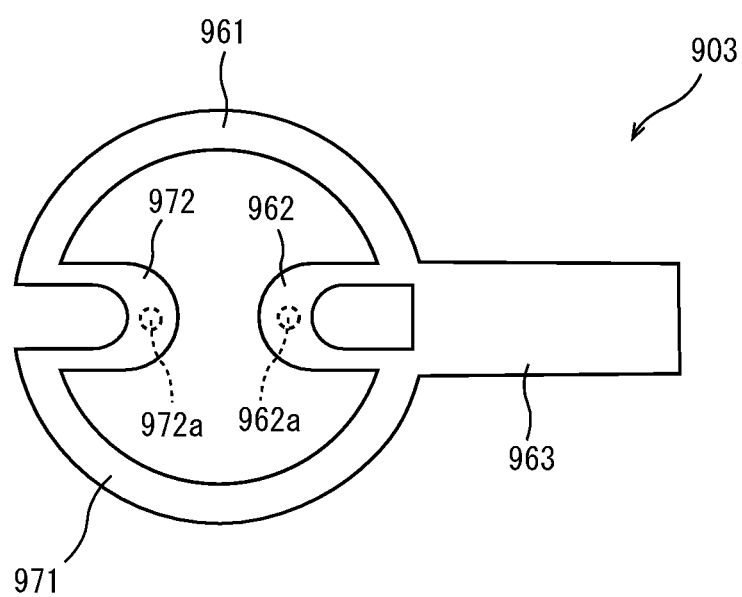
FIG. 15 is a view corresponding to FIG. 7 that illustrates a schematic configuration of an external terminal according to Modification 6 of Embodiment 1.

FIG. 15 illustrates a schematic configuration of an external terminal 903 according to Modification 6 of Embodiment 1. The external terminal 903 includes a pair of outer circumferential portions 961 and 971, a pair of protruding portions 962 and 972, and a connection portion 963.

The pair of outer circumferential portions 961 and 971 have a circular arc shape in plan view. The pair of protruding portions 962 and 972 are formed in a U-shape between the pair of outer circumferential portions 961 and 971 so as to connect the pair of outer circumferential portions 961 and 971. That is, the U-shaped protruding portion 962 is connected to one end portion in the circumferential direction of each of the pair of outer circumferential portions 961 and 971. The U-shaped protruding portion 972 is connected to the other end portion in the circumferential direction of each of the pair of outer circumferential portions 961 and 971. Each of the pair of protruding portions 962 and 972 protrudes inward in the radial direction of the outer circumferential portions 961 and 971. The annular external terminal 903 is formed overall by connecting the pair of outer circumferential portions 961 and 971 with the pair of protruding portions 962 and 972 by means of the pair of protruding portions 962 and 972 in this way.

The connection portion 963 extends outward in the radial direction of the outer circumferential portions 961 and 971 from one end portion in the circumferential direction of the pair of outer circumferential portions 961 and 971. That is, the connection portion 963 connects the pair of outer circumferential portions 961 and 971 at one end portion in the circumferential direction of the pair of outer circumferential portions 961 and 971, and also has a rectangular shape that extends in the opposite direction to the protruding portion 962 in plan view.

In FIG. 15, reference characters 962a and 972a denote welded parts.

Note that, since the functions of the protruding portions 962 and 972 and the outer circumferential portions 961 and 971 of the external terminal 903 according to Modification 6 are basically the same as in the external terminal 403 according to Modification 3, a detailed description of these functions is omitted here.

Embodiment 2

Figure 16:
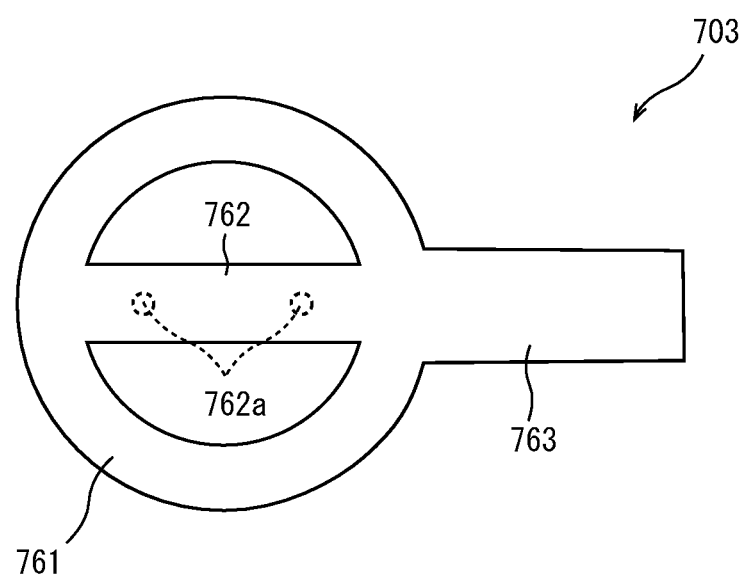
FIG. 16 is a view corresponding to FIG. 7 that illustrates a schematic configuration of an external terminal according to Embodiment 2.

FIG. 16 illustrates a schematic configuration of an external terminal 703 of a battery with external terminals according to Embodiment 2. The external terminal 703 in this embodiment differs from the configuration described in Embodiment 1 in the respect that a linking portion 762 links inner circumferential sides of an outer circumferential portion 761.

As illustrated in FIG. 16, the external terminal 703 includes the outer circumferential portion 761, the linking portion 762 (protruding portion), and a connection portion 763. Since the configurations of the outer circumferential portion 761 and the connection portion 763 are similar to the configurations of the outer circumferential portion 61 and the connection portion 63 of the external terminal 3 of Embodiment 1, a detailed description of these configurations is omitted here.

The linking portion 762 extends in the radial direction with respect to the annular outer circumferential portion 761, and also links together facing portions on the inner circumferential side of the outer circumferential portion 761. That is, in the present embodiment, the linking portion 762 is a portion in which a pair of protruding portions that are provided at positions facing each other in the radial direction on the inner circumferential side of the outer circumferential portion 761 are integrated so as to connect to each other at the center of the outer circumferential portion 761, and which links together inner circumferential sides of the outer circumferential portion 761.

Similarly to Embodiment 1, the linking portion 762 is attached by welding to the mounting portion 11a of the positive electrode can 10 and the negative electrode can-side bottom face portion 21 of the negative electrode can 20 of the flat battery 2. That is, the linking portion 762 has welded parts 762a.

Here, as described in Embodiment 1, in the flat battery 2, the electrode body 40 that is formed by stacking the substantially disc-shaped positive electrodes 41 and negative electrodes 46 in the thickness direction is housed in the housing space S formed between the positive electrode can 10 and the negative electrode can 20. The positive electrode leads 51 that are formed integrally with the corresponding positive electrode collectors 43 of the positive electrodes 41 are connected by welding in a state in which the tip sides thereof are superposed in the thickness direction. Similarly, the negative electrode leads 52 that are formed integrally with the corresponding negative electrode collectors 48 of the negative electrodes 46 are connected by welding in a state in which the tip sides thereof are superposed in the thickness direction.

Therefore, in the flat battery 2, as one part of the housing space S, a space is required for housing the positive electrode leads 51 and the negative electrode leads 52. That is, the housing space S is not only a space that houses the positive electrodes 41 and the negative electrodes 46, but also includes a space that houses the positive electrode leads 51 and the negative electrode leads 52.

In this connection, in the thickness direction of the electrode body 40, the rigidity of the positive electrode leads 51 and the negative electrode leads 52 is weaker than the rigidity of the portion at which the positive electrodes 41 and the negative electrodes 46 are stacked. Therefore, in the process of manufacturing the flat battery 2, in a case where a force in a direction that presses the electrode body 40 in the axial direction of the flat battery 2 acts on the mounting portion 11a of the positive electrode can 10 and the negative electrode can-side bottom face portion 21 of the negative electrode can 20 when crimping the peripheral wall portion 12 of the positive electrode can 10 and the side-wall portion 22 of the negative electrode can 20, there is a possibility that, with respect to the space in which the positive electrode leads 51 and the negative electrode leads 52 are housed, the mounting portion 11a of the positive electrode can 10 and the negative electrode can-side bottom face portion 21 of the negative electrode can 20 will be dented toward the inside of the flat battery 2.

On the other hand, as mentioned previously, in the flat battery 2 after formation, the mounting portion 11a of the positive electrode can 10 and the negative electrode can-side bottom face portion 21 of the negative electrode can 20 swell so as to deform most at the center as viewed in the axial direction of the flat battery 2.

Hence, there is a possibility that concavities and convexities will be formed in the mounting portion 11a of the positive electrode can 10 and the negative electrode can-side bottom face portion 21 of the negative electrode can 20 in the flat battery 2 after formation. In particular, because the positive electrode leads 51 and the negative electrode leads 52 are located on the outer circumferential side of the electrode body 40, there is a possibility that the aforementioned dents will be formed on the outer circumferential side of the mounting portion 11a of the positive electrode can 10 and the negative electrode can-side bottom face portion 21 of the negative electrode can 20. Therefore, there is a possibility that concavities and convexities will be formed on the outer circumferential side of the mounting portion 11a of the positive electrode can 10 and the negative electrode can-side bottom face portion 21 of the negative electrode can 20.

In order to deal with the problem, by providing the linking portion 762 so as to link inner circumferential sides of the outer circumferential portion 761 as in the present embodiment, the linking portion 762 can be prevented from separating from the mounting portion 11a and the negative electrode can-side bottom face portion 21 due to concavities and convexities formed on the outer circumferential side of the mounting portion 11a of the positive electrode can 10 and the negative electrode can-side bottom face portion 21 of the negative electrode can 20. That is, by means of the configuration of the present embodiment, a gap between the linking portion 762 and the mounting portion 11a of the positive electrode can 10 and the negative electrode can-side bottom face portion 21 of the negative electrode can 20 can be more reliably reduced.

Accordingly, in a configuration in which the external terminal 703 is attached by welding to the flat battery 2 having the electrode body 40 in which the positive electrodes 41 and the negative electrodes 46 are stacked, the welding workability when welding the external terminals 703 to the mounting portion 11a of the positive electrode can 10 and the negative electrode can-side bottom face portion 21 of the negative electrode can 20 can be further improved.

Furthermore, as mentioned above, by forming the linking portion 762 in a shape that links inner circumferential sides of the outer circumferential portion 761, the degree of freedom with respect to a welding position in the linking portion 762 (position of welded part 762a) can be improved.

Embodiment 3

Figure 17:
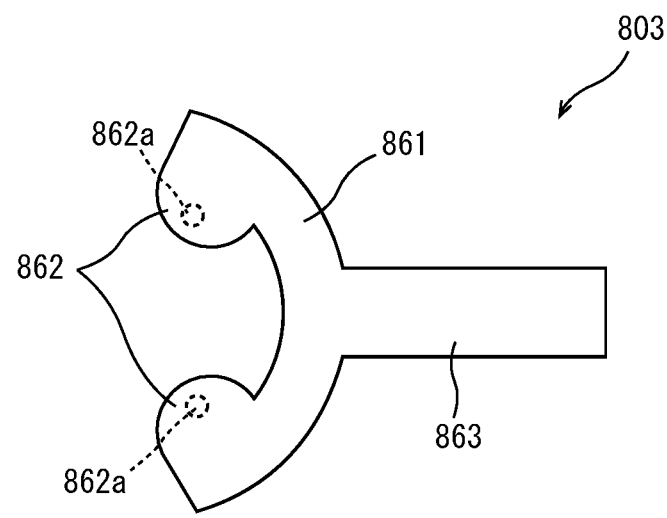
FIG. 17 is a view corresponding to FIG. 7 that illustrates a schematic configuration of an external terminal according to Embodiment 3.

FIG. 17 illustrates a schematic configuration of an external terminal 803 of a battery with external terminals according to Embodiment 3. The external terminal 803 in the present embodiment differs from the configuration of Embodiment 1 in the respect that an outer circumferential portion 861 is a circular arc shape, and two protruding portions 862 are provided at the two ends of the outer circumferential portion 861, and also that the overall shape of the external terminal 803 is not an annular shape.

As illustrated in FIG. 17, the external terminal 803 includes the outer circumferential portion 861, the protruding portions 862 and a connection portion 863. Since the configuration of the connection portion 863 is similar to the configurations of the connection portion 63 of the external terminal 3 of Embodiment 1, a detailed description of the connection portion 863 is omitted here.

The outer circumferential portion 861 is a circular arc shape in plan view. The protruding portions 862 are formed at both end portions in the circumferential direction of the outer circumferential portion 861, and protrude toward the inside in the radial direction of the outer circumferential portion 861. Similarly to Embodiment 1, the protruding portions 862 are attached by welding to the mounting portion 11a of the positive electrode can 10 and the negative electrode can-side bottom face portion 21 of the negative electrode can 20 of the flat battery 2. That is, each protruding portion 862 has a welded part 862a.

According to the configuration of the present embodiment, the protruding portions 862 can be caused to follow deformation of the mounting portion 11a of the positive electrode can 10 and the negative electrode can-side bottom face portion 21 of the negative electrode can 20 in the flat battery 2 after formation. Thereby, similarly to Embodiments 1 and 2, the welding workability when welding together the external terminals 803 and the flat battery 2 can be improved.

Furthermore, in the aforementioned configuration, by forming the outer circumferential portion 861 in a circular arc shape, the external terminal 803 is arranged only at one portion with respect to the flat battery 2. Thereby, it is possible to suppress an increase in the dimension in the thickness direction of the battery with external terminals across the entire circumference thereof.

Other Embodiments

While embodiments of the present invention have been described above, the foregoing embodiments are merely examples for implementing the present invention. Accordingly, the present invention is not limited to the above embodiments, and the above embodiments can be appropriately modified and implemented within a range that does not deviate from the gist of the present invention.

In the respective embodiments described above, the external terminals 3, 203, 303, 403, 503, 603, 703, 803 or 903 are attached by welding to both the mounting portion 11a of the positive electrode can 10 and the negative electrode can-side bottom face portion 21 of the negative electrode can 20 of the flat battery 2. However, a configuration may be adopted in which the external terminal is attached by welding to only one of the mounting portion of the positive electrode can and the negative electrode can-side bottom face portion of the negative electrode can.

In the respective embodiments described above, the battery with external terminals 1 has a configuration in which the external terminals 3, 203, 303, 403, 503, 603, 703, 803 or 903 are attached by welding to the flat battery 2. However, as long as a battery that is used for the battery with external terminals is a battery that has an exterior can and a sealing can, the battery may be a shape other than a flat shape, for example, a cylindrical shape or a rectangular tube shape. Further, the electrode body 40 of the battery is not limited to a structure in which the positive electrodes 41 and the negative electrodes 46 are stacked, and may be a wound body in which band-like positive electrodes and negative electrodes are wound. Note that, in the case of an electrode body in which positive electrodes and negative electrodes are alternately positioned in the axial direction of the battery, the electrode body will expand in the axial direction due to formation of the battery and the like. Therefore, the positive electrode can-side bottom face portion of the positive electrode can and the negative electrode can-side bottom face portion of the negative electrode can are liable to swell outward. Hence, the configurations of the respective embodiments described above are particularly effective for a battery with external terminals in which external terminals are attached by welding to a battery including an electrode body in which positive electrodes and negative electrodes are alternately positioned in the axial direction of the battery.

In each of the foregoing embodiments, the external terminal 3, 203, 303, 403, 503, 603, 703, 803 and 903 has one connection portion 63, 263, 363, 463, 563, 663, 763, 863 and 963, respectively. However, the external terminal may have two or more connection portions.

In each of the foregoing embodiments, the protruding portions 62, 262, 362, 462, 562, 662, 862, 962 and 972 of the external terminal 3, 203, 303, 403, 503, 603, 803 and 903 extend toward the center of the outer circumferential portion 61, 261, 361, 461, 561, 661, 861, 961 and 971, respectively. However, as long as the protruding portions extend toward the inward side of the outer circumferential portion, the protruding portions may extend toward a position other than the center of the outer circumferential portion.

In Embodiment 1, with respect to the negative electrode can-side mounting face 25, the protruding portions 62 and 262 do not overlap with a region that, when viewed in the normal line direction of the negative electrode can-side mounting face 25, is located on the inner side of a position that, with respect to the distance from the center to the outer edge of the portion constituting the negative electrode can-side mounting face 25, is located at a distance from the center that is one-third of the aforementioned distance from the center to the outer edge. Further, with respect to the negative electrode can-side mounting face 25, the protruding portions 362, 462, 562, 662, 962 and 972 do not overlap with a region that, when viewed in the normal line direction of the negative electrode can-side mounting face 25, is located on the inner side of a position that, with respect to the distance from the center to the outer edge of the portion constituting the negative electrode can-side mounting face 25, is located at a distance from the center that is approximately one-fifth of the aforementioned distance from the center to the outer edge. Similarly, with respect to the positive electrode can-side mounting face 15, the protruding portions 62 and 262 do not overlap with a region that, when viewed in the normal line direction of the positive electrode can-side mounting face 15, is located on the inner side of a position that, with respect to the distance from the center to the outer edge of the portion constituting the positive electrode can-side mounting face 15, is located at a distance from the center that is one-third of the aforementioned distance from the center to the outer edge. Further, with respect to the positive electrode can-side mounting face 15, the protruding portions 362, 462, 562, 662, 962 and 972 do not overlap with a region that, when viewed in the normal line direction of the positive electrode can-side mounting face 15, is located on the inner side of a position that, with respect to the distance from the center to the outer edge of the portion constituting the positive electrode can-side mounting face 15, is located at a distance from the center that is approximately one-fifth of the aforementioned distance from the center to the outer edge.

However, with respect to at least one of the negative electrode can-side mounting face and the positive electrode can-side mounting face, the protruding portions may overlap with a region that, when viewed in the normal line direction of the mounting face to which the external terminal is attached, is located on the inner side of a position that, with respect to the distance from the center to the outer edge of the portion constituting the mounting face, is located at a distance from the center that is one-third of the aforementioned distance from the center to the outer edge. Further, with respect to at least one of the negative electrode can-side mounting face and the positive electrode can-side mounting face, the protruding portions may overlap with a region that, when viewed in the normal line direction of the mounting face to which the external terminal is attached, is located on the inner side of a position that, with respect to the distance from the center to the outer edge of the portion constituting the mounting face, is located at a distance from the center that is approximately one-fifth of the aforementioned distance from the center to the outer edge.

In Embodiment 2, the linking portion 762 links portions that face each other in the radial direction of the outer circumferential portion 761. However, as long as the linking portion 762 links together inner circumferential sides of the outer circumferential portion 761, the linking portion 762 may link portions other than portions that face each other in the radial direction of the outer circumferential portion 761.

In Embodiments 1 and 2, the outer circumferential portions 61, 261, 361, 461, 561, 661 and 761 are annular. However, the outer circumferential portion may be a circular arc shape as in Modification 6 of Embodiment 1 and in Embodiment 3, or may be a shape other than a circular arc shape. That is, it suffices that the outer circumferential portion is formed so as to follow the outer shape of the negative electrode can-side mounting face 25 of the negative electrode can 20. Further, the outer circumferential portion may be formed so as to follow the outer shape of the mounting portion 11a of the positive electrode can 10. Note that, in the respective configurations of Embodiments 1 and 2, preferably the outer circumferential portions are provided so as to face each other in plan view.

In Embodiment 1, although a configuration is described in which the external terminal 3 has four protruding portions 62, the external terminal may have five or more protruding portions. Further, the external terminal may have one protruding portion. In addition, the configurations of Modifications 2 to 6 may be applied to an external terminal having three or more protruding portions.

In each of the foregoing embodiments, the positive electrode 41 includes a positive electrode active material layer containing a positive electrode active material such as lithium cobalt oxide, and the negative electrode 46 includes a the negative electrode active material layer 47 containing a negative electrode active material such as graphite. However, the configurations of the positive electrode and the negative electrode may be other than the above described configurations.

In each of the foregoing embodiments, the positive electrode can 10 is provided as an exterior can, and the negative electrode can 20 is provided as a sealing can, however a configuration may be adopted in which, conversely, the positive electrode can is a sealing can, and the negative electrode can is an exterior can.

Although in each of the foregoing embodiments the flat battery 2 is a secondary battery, the flat battery 2 may be a primary battery.

In each of the foregoing embodiments, the external terminals 3, 103, 203, 303, 403, 503, 603, 703, 803 and 903 and the flat battery 2 are welded by laser welding. However, the external terminals and the flat battery may be welded by a welding method other than laser welding.

EXAMPLES

<Production of Positive Electrodes>

Positive electrodes were produced using $LiCoO_2$ as a positive electrode active material, carbon black as a conductive additive, and PVDF as a binder. A positive electrode mixture-containing paste was prepared by mixing 93 parts by mass of $LiCoO_2$, 3 parts by mass of carbon black and 4 parts by mass of PVDF in N-methyl-2-pyrrolidone (NMP). Next, the obtained positive electrode mixture-containing paste was coated onto both faces of a positive electrode collector made of aluminum foil that was 15 μm in thickness. Note that, when performing coating with the positive electrode mixture-containing paste, the coating was performed so that coated portions and non-coated portions were alternately positioned at intervals of 5 cm, and so that the locations of the coated portions on the front face corresponded to the locations of the coated portions on the rear face. Furthermore, the coated positive electrode mixture-containing paste was dried to form a positive electrode active material layer. The positive electrode active material layer and the positive electrode collector were subjected to roll-pressing, and thereafter cutting into a predetermined size was performed to obtain a positive electrode sheet. Note that, the width of the positive electrode sheet was 40 mm, and the thickness at a place at which the positive electrode active material layer was formed was 140 μm.

The positive electrode sheet was punched into the shape illustrated in FIG. 5 so that a place at which the positive electrode active material layer was formed became a positive electrode main body portion [diameter (maximum diameter) of circular arc portion: 6.2 mm], and a place at which only the positive electrode collector was present and at which the positive electrode active material layer was not formed became a positive electrode lead, to thereby obtain positive electrodes.

<Housing of Positive Electrode in Bag-Like Separator>

Figure 18:
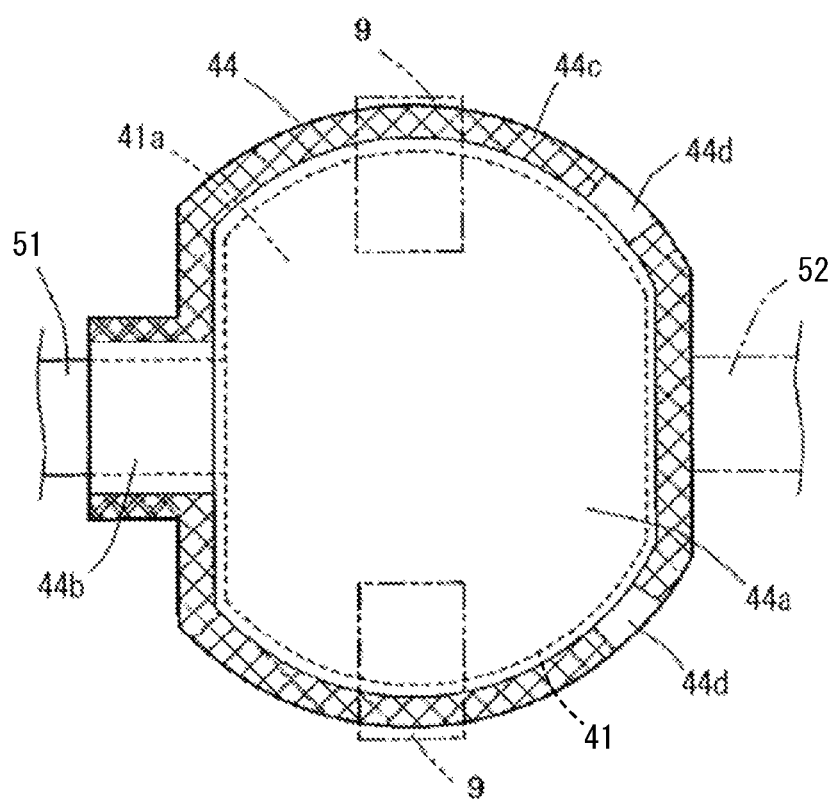
FIG. 18 is a plan view illustrating the schematic configuration of an electrode body.

A microporous membrane made of PE (thickness of 16 μm) having a shape illustrated in FIG. 18 was disposed on both faces of the positive electrode, and portions of the microporous membranes made of PE which overlapped with the perimeter of the positive electrode were subjected to thermal welding by hot-pressing (temperature: 170° C.; pressing time: 2 secs). Thereby a bag-shaped separator composed of the microporous membranes made of PE in which the positive electrode was housed was formed. Note that, the width of a thermal weld in the separator was 0.25 mm, and the diameter (maximum diameter) of a circular arc portion of the separator was 7.2 mm.

<Production of Negative Electrodes>

Negative electrodes were produced using graphite as a negative electrode active material, and PVDF as a binder. A negative electrode mixture-containing paste was prepared by mixing 94 parts by mass of the graphite and 6 parts by mass of PVDF in NMP. Next, the obtained negative electrode mixture-containing paste was coated onto one face or both faces of a negative electrode collector made of copper foil that was 10 μm in thickness. Note that, when performing coating with the negative electrode mixture-containing paste, the coating was performed so that coated portions and non-coated portions were alternately positioned at intervals of 5 cm, and in a case where both faces of the negative electrode collector were coated with the negative electrode mixture-containing paste, so that the locations of the coated portions on the front face corresponded to the locations of the coated portions on the rear face. Furthermore, the coated negative electrode mixture-containing paste was dried to form a negative electrode active material layer. The negative electrode active material layer and the negative electrode collector were subjected to roll-pressing, and thereafter cutting into a predetermined size was performed to obtain a negative electrode sheet. Note that, the width of the negative electrode sheet was 40 mm, and the thickness at a place at which the negative electrode active material layer was formed was 190 μm with respect to a portion for which the negative electrode active material layer was formed on both faces of the negative electrode collector, and was 100 μm with respect to a portion for which the negative electrode active material layer was formed on only one face of the negative electrode collector.

The negative electrode sheet was punched into the shape illustrated in FIG. 6 so that a place at which the negative electrode active material layer was formed became a negative electrode main body portion [diameter (maximum diameter) of circular arc portion: 7.2 mm], and a place at which only the negative electrode collector was present and at which the negative electrode active material layer was not formed became a negative electrode lead, to thereby obtain negative electrodes having a negative electrode active material layer on one face of a collector, and negative electrodes having a negative electrode active material layer on both faces of a collector.

<Assembly of Battery>

Nine positive electrodes housed in the aforementioned bag-like separators, eight negative electrodes having a negative electrode active material layer formed on both faces of a negative electrode collector, and two negative electrodes having a negative electrode active material layer formed on only one face of a negative electrode collector (in one of these negative electrodes, a PET film was attached onto the exposed face of the negative electrode collector) were prepared, and these electrodes were stacked in a manner so that the negative electrodes having the negative electrode active material layer formed on only one face of a negative electrode collector were positioned on the outermost sides, to thereby produce an electrode body.

FIG. 18 illustrates an electrode body in which the positive electrode 41, the negative electrode 46 and the separator 44 are stacked. In FIG. 18, the positive electrode 41 that is arranged under the separator 44 is indicated by a dotted line, the negative electrode lead 52 of the negative electrode 46 that is arranged further on the underside of the separator 44 and the positive electrode 41 is indicated by alternate long and short dash lines, and a binding tape 9 for inhibiting displacement of each constituent element of the electrode body is indicated by a chain double-dashed line. Further, in the electrode body, the positive electrode 41 illustrated in FIG. 18 was stacked with the negative electrode 46 via one separator 44 among a pair of the separators 44 that were integrated in a manner in which the pair of separators 44 sandwiched the positive electrode 41 in the thickness direction. Note that, although not particularly illustrated in FIG. 18, the negative electrode was arranged on the underside of the separator 44 (side facing away from the viewer in FIG. 18).

The separator 44 illustrated in FIG. 18 has a joint 44c (indicated by a lattice pattern in FIG. 18) at which the separator 44 was welded at a peripheral edge portion to another separator 44 arranged on the underside thereof in a manner such that the positive electrode 41 (indicated by a dotted line in FIG. 18) was sandwiched in the thickness direction thereof between the two separators 44. That is, the pair of separators 44 that were arranged so as to sandwich the positive electrode 41 in the thickness direction were welded to each other at the peripheral edge portions to form a bag shape, and the positive electrode 41 was housed therein, and in this way the positive electrode 41 and the separators 44 were integrated.

Note that, the separator 44 illustrated in FIG. 18 includes a main body portion 44a that covers the entire surface of the positive electrode main body portion 41a of the positive electrode 41 (that is, the main body portion 44a has a larger area in in plan view than the positive electrode main body portion 41a of the positive electrode 41), and an overhang portion 44b that protrudes from the main body portion 44a to cover a boundary portion with the positive electrode main body portion 41a with respect to the positive electrode lead 51 of the positive electrode 41. The joint 44c at which the pair of separators 44 arranged on both sides of the positive electrode 41 were welded together was provided at least at one part of the peripheral edge portion of the main body portion 44a and the overhang portion 44b of the separator 44. Further, a non-welded portion 44d at which the separators 44 were not welded together was provided at one part of the peripheral edge portion of the main body portion 44a.

Next, the electrode body was housed inside a negative electrode can in which a gasket had been mounted, in a manner so that the negative electrode to which the aforementioned PET film was attached was positioned on the opening side of the negative electrode can. Thereafter, the leads of the respective negative electrodes were brought together and welded, and the leads were folded back over the PET film of the negative electrode. An insulating material (PET film with a thickness of 0.1 mm) was placed thereon, and furthermore, the leads of the respective positive electrodes were brought together and welded, and the positive electrode leads were folded back over the insulating material.

Next, a non-aqueous electrolyte (solution in which LiPF6 was dissolved at a concentration of 1.2 mol/l in a mixed solvent containing ethylene carbonate and methyl ethyl carbonate at a volume ratio of 1:2) was injected into the negative electrode can, and after the positive electrode can was covered, the periphery of the positive electrode can was crimped to obtain a flat non-aqueous secondary battery having a diameter of 9 mm and a thickness of 3.7 mm.

As the formation process for the thus-produced battery, the battery was charged at a constant current of 0.1 C until the battery voltage reached 4.2V, and was then charged at a constant voltage of 4.2V, and thereafter discharging was performed at a current value of 0.1 C until the voltage became 3V.

Because swelling of the battery occurred due to the formation process, the thickness increased by approximately 0.2 mm at the center portion of the battery.

Example 1

External terminals having the shape illustrated in FIG. 16 were welded onto the positive electrode can-side bottom face portion and the negative electrode can-side bottom face portion, respectively, of 100 of the batteries that had undergone the aforementioned formation process, to thereby produce batteries with external terminals.

Note that, each external terminal was composed of SUS 304 whose surface was plated with Ni. The thickness of the external terminal was 0.1 mm, the outer circumferential portion 761 had an outer diameter of 8.5 mm and a width (one-half of the difference between the outer diameter and the inner diameter) of 1 mm, and the width of the linking portion 762 was 2 mm. Further, each external terminal was welded to the battery so that, when viewed in the normal line direction of the mounting faces (positive electrode can-side bottom face portion and negative electrode can-side bottom face portion) of the external terminal, the interval between the welded parts 762a at two places that were provided on the linking portion 762 so that the center of the battery was located therebetween was 3 mm.

Note that, in order to more easily cause the outer circumferential portion 761 to deform, the width of the outer circumferential portion 761 is preferably made 2 mm or less, and more preferably is made 1.5 mm or less. On the other hand, in order to maintain the strength of the external terminal, the width of the outer circumferential portion 761 is preferably made 0.5 mm or more.

When welding the external terminals to the battery, welding by laser was performed in a state in which the outer circumferential portion 761 of the external terminal was pressed down. At such time, the linking portion 762 deformed so as to follow the outer shape of the battery in which swelling had occurred, and therefore welding could be favorably performed. Further, the strength of the welded parts 762a could also be adequately secured.

Comparative Example 1

Figure 19:
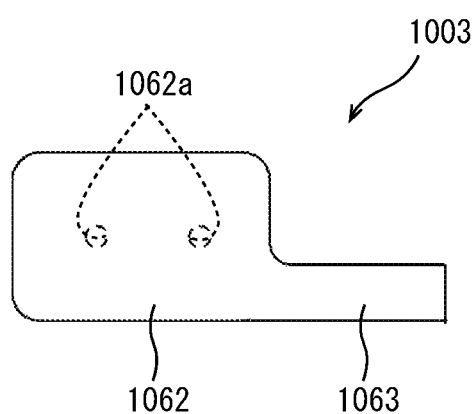
FIG. 19 is a plan view illustrating the schematic configuration of an external terminal according to Comparative Example 1.

Batteries with external terminals were produced in a similar manner to Example 1 using external terminals 1003 having the shape illustrated in FIG. 19. The external terminal 1003 included a rectangular portion 1062 having a rectangular shape in plan view, and a connection portion 1063. The rectangular portion 1062 had two welded parts 1062a that were welded to a mounting face of the battery.

The rectangular portion 1062 at which the welded parts 1062a were formed of the external terminal 1003 had a size of approximately 6 mm×4 mm. The external terminal 1003 was welded to the battery in a manner so that an interval between the two welded parts 1062a was 3 mm.

When welding the external terminal 1003 to the battery, welding was performed while pressing down the external terminal 1003 in the vicinity of the welded parts 1062a of the external terminal 1003. Because a gap arose between the rectangular portion 1062 of the external terminal 1003 and the battery during welding of the external terminal 1003 and the battery, welding defects occurred in half or more of the batteries with external terminals. Hence, in the case of using the external terminal 1003 for a battery with external terminals, the strength of the welded parts 1062a could not be adequately secured.

INDUSTRIAL APPLICABILITY

The battery with external terminals according to the present invention can be utilized for a configuration in which an external terminal is attached to a battery by welding.

REFERENCE SIGNS LIST

1 Battery with external terminals
2 Flat battery (battery)
3, 103, 203, 303, 403, 503, 603, 703, 803, 903, 1003 External terminal
10 Positive electrode can (exterior can)
11 Positive electrode can-side bottom face portion
11a Mounting portion
11b Step portion
12 Peripheral wall portion
13 Opening end portion
15 Positive electrode can-side mounting face (mounting face)
20 Negative electrode can (sealing can)
21 Negative electrode can-side bottom face portion
22 Side-wall portion
25 Negative electrode can-side mounting face (mounting face)
40 Electrode body (power-generating element)
41 Positive electrode
41a positive electrode main body portion
42 Positive electrode active material layer
43 Positive electrode collector
44 Separator
46 Negative electrode
46a Negative electrode main body portion
47 Negative electrode active material layer
48 Negative electrode collector
49 Insulating sheet
51 Positive electrode lead
52 Negative electrode lead
61, 261, 361, 461, 561, 661, 761, 861, 961, 971 Outer circumferential portion
62, 262, 362, 462, 562, 662, 862, 962, 972 Protruding portion
62a, 262a, 362a, 462a, 562a, 662a, 762a, 862a, 962a, 972a, 1062a Welded part
63, 263, 363, 463, 563, 663, 763, 863, 963, 1063 Connection portion
561a Notch portion
662b Notch portion
762 Linking portion
1062 Rectangular portion

The invention claimed is:
1. A battery with external terminals in which an external terminal is attached to a battery by welding, the battery comprising:
an exterior can including a positive electrode can-side bottom face portion and a peripheral wall portion that extends in an axial direction, and having an opening on an opposite side to the positive electrode can-side bottom face portion in the axial direction, a sealing can including a negative electrode can-side bottom face portion, and a power-generating element that is arranged in a housing space which is formed on an inner side of the exterior can and the sealing can in a state in which the peripheral wall portion of the exterior can and the sealing can are connected in a manner so that the sealing can covers the opening of the exterior can, wherein at least one of the positive electrode can-side bottom face portion and the negative electrode can-side bottom face portion of the battery has a mounting face to which the external terminal is attached by welding;

the external terminal comprising:

an outer circumferential portion that, with respect to the mounting face, is formed so as to overlap with a region that, with respect to a distance from a center to an outer edge of a portion constituting the mounting face as viewed in a normal line direction of the mounting face, is on an outer side relative to a position located one-half of the distance from the center, and so as not to overlap with a region which is on an inner side relative to the position located one-half of the distance from the center, at least one protruding portion that, as viewed in the normal line direction of the mounting face, is formed so as to protrude toward an inner side of the battery from the outer circumferential portion, and at least one connection portion that, as viewed in the normal line direction of the mounting face, is formed so as to protrude toward an outer side of the battery from the outer circumferential portion, and that electrically connects the battery to a device;

wherein the protruding portion has a welded part at which the protruding portion is welded to the mounting face of the battery.

2. The battery with external terminals according to claim 1, wherein the external terminal has a plurality of the protruding portions.

3. The battery with external terminals according to claim 2, wherein the plurality of protruding portions are formed so as to extend toward the center of the battery from the outer circumferential portion, as viewed in the normal line direction of the mounting face.

4. The battery with external terminals according to claim 2, wherein, with respect to the mounting face, the plurality of protruding portions do not overlap with a region that, with respect to a distance from the center to the outer edge of the portion constituting the mounting face as viewed in the normal line direction of the mounting face, is on an inner side relative to a position located at a distance from the center that is one-third of the distance.

5. The battery with external terminals according to claim 2, wherein at least one pair of protruding portions among the plurality of protruding portions are formed at positions that face each other across the center of the mounting face as viewed in the normal line direction of the mounting face.

6. The battery with external terminals according to claim 5, wherein the one pair of protruding portions are formed so as to connect to each other at the center of the mounting face as viewed in the normal line direction of the mounting face.

7. The battery with external terminals according to claim 1, wherein the outer circumferential portion of the external terminal is formed so as to follow at least one part of an outer shape of the portion constituting the mounting face.

8. The battery with external terminals according to claim 7, wherein the outer circumferential portion of the external terminal is formed in a circular arc shape or an annular shape as viewed in the normal line direction of the mounting face.

9. The battery with external terminals according to claim 1, wherein the battery is a flat shape in which a dimension in a direction perpendicular to the axial direction is larger than a dimension in the axial direction.

10. The battery with external terminals according to claim 1, wherein the battery is a secondary battery.

11. The battery with external terminals according to claim 1, wherein the welded part is formed by laser welding.

* * * * *